US012591411B2

(12) United States Patent
Sohrabizadeh et al.

(10) Patent No.: US 12,591,411 B2
(45) Date of Patent: Mar. 31, 2026

(54) SYSTEM AND METHOD TO ACCELERATE GRAPH FEATURE EXTRACTION

(71) Applicant: Samsung Electronics Co., Ltd., Suwon-si (KR)

(72) Inventors: Atefeh Sohrabizadeh, Los Angeles, CA (US); Caroline D. Kahn, Santa Clara, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 954 days.

(21) Appl. No.: 17/530,452

(22) Filed: Nov. 18, 2021

(65) Prior Publication Data

US 2022/0214861 A1     Jul. 7, 2022

Related U.S. Application Data

(60) Provisional application No. 63/251,581, filed on Oct. 1, 2021, provisional application No. 63/248,422, filed on Sep. 24, 2021, provisional application No. 63/134,585, filed on Jan. 6, 2021.

(51) Int. Cl.
$$G06F\ 7/544 \qquad (2006.01)$$
$$G06F\ 9/30 \qquad (2018.01)$$
$$G06F\ 9/38 \qquad (2018.01)$$
(52) U.S. Cl.
CPC .......... G06F 7/5443 (2013.01); G06F 9/3001 (2013.01); G06F 9/3887 (2013.01); G06F 9/3893 (2013.01)

(58) Field of Classification Search
CPC ..... G06F 7/5443; G06F 9/3887; G06F 9/3893
See application file for complete search history.

(56) References Cited

U.S. PATENT DOCUMENTS

| | | | |
|---|---|---|---|
| 10,528,864 B2 | 1/2020 | Dally et al. | |
| 10,552,737 B2 | 2/2020 | Seibold et al. | |
| 10,657,306 B1 | 5/2020 | Ma et al. | |
| 10,664,751 B2 | 5/2020 | Henry et al. | |
| 10,740,676 B2 | 8/2020 | Durdanovic et al. | |

(Continued)

FOREIGN PATENT DOCUMENTS

| | | |
|---|---|---|
| CN | 110059760 A | 7/2019 |
| EP | 3408798 A1 | 12/2018 |

(Continued)

OTHER PUBLICATIONS

Auten, Adam et al., "Hardware Acceleration of Graph Neural Networks," 2020 57th ACM/IEEE Design Automation Conference (DAC), IEEE, Jul. 2020, 6 pages.

(Continued)

*Primary Examiner* — Michael D. Yaary
(74) *Attorney, Agent, or Firm* — Renaissance IP Law Group LLP

(57) ABSTRACT
A device is disclosed. The device may include a multiplication module, an accumulation and aggregation (ACG) module, and a control unit. The multiplication module may perform a multiplication based on a node data for a graph or a weight data. The ACG module may perform an accumulation and aggregation operation based on the multiplication module or an edge data for the graph. The control unit may manage the multiplication module and the ACG module.

20 Claims, 17 Drawing Sheets

(56)                    References Cited

U.S. PATENT DOCUMENTS

| | | | |
|---|---|---|---|
| 10,832,133 | B2 | 11/2020 | Matveev et al. |
| 10,963,787 | B2 | 3/2021 | Zlateski et al. |
| 11,010,516 | B2 | 5/2021 | Sikka et al. |
| 11,030,528 | B1 | 6/2021 | Zhuo et al. |
| 2018/0114114 | A1 | 4/2018 | Molchanov et al. |
| 2018/0189063 | A1* | 7/2018 | Fleming ............. G06F 13/4221 |
| 2019/0122113 | A1 | 4/2019 | Chen et al. |
| 2019/0303762 | A1 | 10/2019 | Sui et al. |
| 2019/0354832 | A1 | 11/2019 | Bronstein et al. |
| 2020/0104717 | A1 | 4/2020 | Alistarh |
| 2020/0151288 | A1 | 5/2020 | Ma et al. |
| 2020/0160181 | A1 | 5/2020 | Zlateski et al. |
| 2021/0042624 | A1 | 2/2021 | Matveev et al. |
| 2021/0150685 | A1 | 5/2021 | Chen et al. |
| 2021/0158127 | A1 | 5/2021 | Ren et al. |
| 2021/0182077 | A1* | 6/2021 | Chen ..................... G06F 7/5443 |
| 2024/0007414 | A1* | 1/2024 | Jain ....................... G06F 9/5088 |

FOREIGN PATENT DOCUMENTS

| | | |
|---|---|---|
| TW | 201606532 A | 2/2016 |
| WO | 2020016579 A2 | 1/2020 |

OTHER PUBLICATIONS

Choo, Kyoshin et al., "Understanding and Optimizing GPU Cache Memory Performance for Compute Workloads," 2014 IEEE 13th International Symposium on Parallel and Distributed Computing, 2014, pp. 189-196.

European Extended Search Report for Application No. 22150269.3, mailed Jul. 11, 2022.

European Office Action for Application No. 22150269.3, mailed Feb. 22, 2023.

European Summons to Oral Proceedings for Application No. 22150269.3, mailed Oct. 19, 2023.

Geng, Tong et al., "AWB-GCN: A Graph Convolutional Network Accelerator with Runtime Workload Rebalancing," 2020 53rd Annual IEEE/ACM International Symposium on Microarchitecture (MICRO), IEEE, 2020, pp. 922-936.

Kiningham, Kevin et al., "GRIP: A Graph Neural Network Accelerator Architecture," Jul. 2020, 14 pages.

Lee, Yongjin, "Differentiable Sparsification for Deep Neural Networks," arXiv preprint, 2019, 22 pages.

Liang, Shengwen et al., "DeepBurning-GL: an Automated Framework for Generating Graph Neural Network Accelerators," 2020 IEEE/ACM International Conference on Computer Aided Design (ICCAD), Association on Computer Machinery, Nov. 2020, pp. 1-9.

Liang, Shengwen et al., "EnGN: A High-Throughput and Energy-Efficient Accelerator for Large Graph Neural Networks," IEEE Transactions on Computers, IEEE, vol. 70, No. 9, Aug. 2020, pp. 1511-1525.

Parashar, Angshuman et al., "SCNN: An Accelerator for Compressed-Sparse Convolutional Neural Networks," May 2017, pp. 1-12.

Sohrabizadeh, Atefeh et al., "SPA-GCN: Efficient and Flexible GCN Accelerator with an Application for Graph Similarity Computation," arxiv.org, Nov. 2021, 12 pages.

Wu, Felix, "On the Efficiency in Neural Networks: Exposing Unnecessary Computation," Dissertation, Cornell University, Dec. 2020, 199 pages.

Yan, Mingyu et al., "HyGCN: A GCN Accelerator with Hybrid Architecture," arxiv.org, Jan. 2020, 14 pages.

Zhang, Bingyi et al., "Hardware Acceleration of Large Scale GCN Inference," 2020 IEEE 31st International Conference on Application-Specific Systems, Architectures and Processors (ASAP), IEEE, Jul. 2020, pp. 61-68.

Liang, Shengwen et al., "EnGN: A High-Throughput and Energy-Efficient Accelerator for Large Graph Neural Networks," IEEE Transactions on Computers, vol. 70, No. 9, Aug. 2020, 14 pages.

* cited by examiner

405

410

| Nodes | |
|---|---|
| 1 | 4 |
| 2 | 5 |
| 3 | |

| Edges | |
|---|---|
| 1, 2 | 3, 4 |
| 2, 1 | 4, 2 |
| 2, 4 | 4, 3 |
| 2, 5 | 5, 2 |

| Nodes | |
|---|---|
| 1 | 4 |
| 2 | 5 |
| 3 | |

| Edges | |
|---|---|
| 1, 2 | 2, 5 |
| 2, 4 | 3, 4 |

| Nodes | |
|---|---|
| 1 | 4 |
| 2 | 5 |
| 3 | |

| Edges | | | | | |
|---|---|---|---|---|---|
| | 1 | 2 | 3 | 4 | 5 |
| 1 | 0 | 1 | 0 | 0 | 0 |
| 2 | 1 | 0 | 0 | 1 | 1 |
| 3 | 0 | 0 | 0 | 1 | 0 |
| 4 | 0 | 1 | 1 | 0 | 0 |
| 5 | 0 | 1 | 0 | 0 | 0 |

FIG. 4C

SYSTEM AND METHOD TO ACCELERATE GRAPH FEATURE EXTRACTION

RELATED APPLICATION DATA

This application claims the benefit of U.S. Provisional Patent Application Ser. No. 63/134,585, filed Jan. 6, 2021, U.S. Provisional Patent Application Ser. No. 63/248,422, filed Sep. 24, 2021, and U.S. Provisional Patent Application Ser. No. 63/251,581, filed Oct. 1, 2021, all of which are incorporated by reference herein for all purposes.

FIELD

The disclosure relates generally to accelerators, and more particularly to an accelerator to support graph network processing.

BACKGROUND

Graphs, particularly unstructured graphs, may be difficult for a machine to process. For example, comparing two graphs to determine if they are similar may be difficult to perform programmatically. Nodes and edges may be labeled differently, presented in varying orders, and assigned different weights (but in proportion), which may result in two similar graphs appearing different.

A need remains to extract features from a graph for later use.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 4A shows a first way to represent the graph of FIG. 3 in a computer system, according to embodiments of the disclosure.

FIG. 4B shows a second way to represent the graph of FIG. 3 in a computer system, according to embodiments of the disclosure.

FIG. 4C shows a third way to represent the graph of FIG. 3 in a computer system, according to embodiments of the disclosure.

SUMMARY

Figure 1:
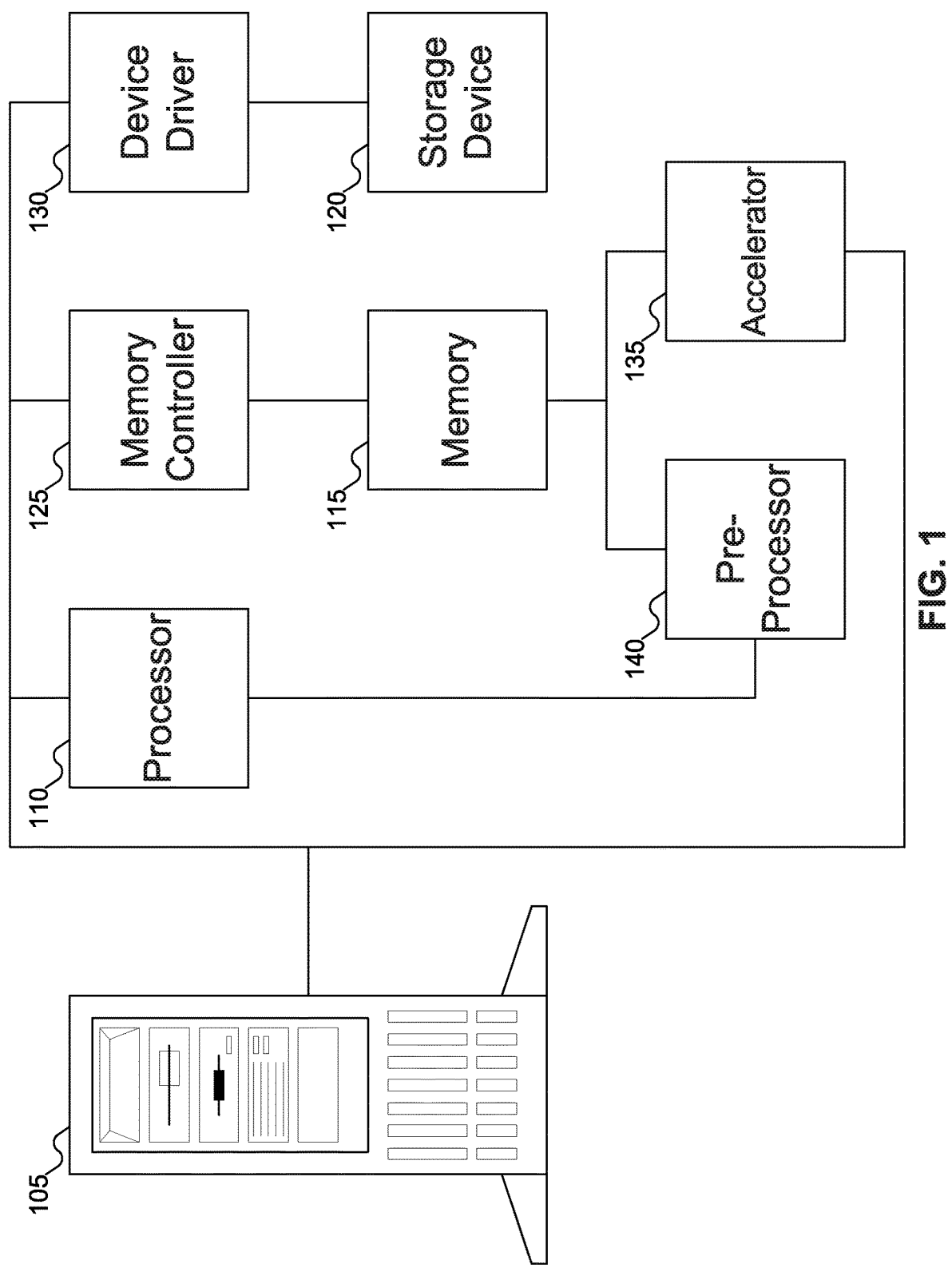
FIG. 1 shows a machine including an accelerator to extract features from a graph, according to embodiments of the disclosure.

Embodiments of the disclosure include an accelerator to extract features from a graph. Node data may be pre-fetched and subject to one or more Graph Convolutional Network (GCN) layers. The GCN layers may include a multiplication module and an accumulate and aggregate (ACG) module.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

One way to extract information from a graph that may be used to compare graphs or otherwise use graphs is called Graph Convolutional Networks (GCN). GCN involves extracting features from the graph by aggregating elements, performing a feature transformation on the aggregated elements, then performing activation to produce features. This process may be performed two or more times to extract the desired features.

Embodiments of the disclosure may use an accelerator to implement GCN. A multiplication module may perform multiplication of elements in parallel, and an accumulate and aggregate (ACG) module may perform feature extraction from the data provided by the multiplication module. Multiple multiplication modules and ACG models may be used to implement more than one layer, as desired.

The multiplication module may include an arbiter to select elements to be processed and a single instruction, multiple data processing element (SIMD PE) to perform the processing. The arbiter may determine whether a particular element may attempt to read a value that has not yet been written (which may be termed a data dependency) and may insert a bubble to delay the operation on that element.

The ACG module may include SIMD PEs to execute the accumulate and aggregate operations based on the data provided by the multiplication module. The ACG module may also include a rectified linear unit (ReLU) to perform activation: that is, to isolate only the positive values (and replace negative values with zeroes). The ACG module may also include a pruner to remove any zero values in the data (which may be either returned from the accelerator or provided to the multiplication module in the next layer).

The accelerator may also include a pre-fetcher. The pre-fetcher may retrieve data for the graph from memory and buffer the data in the accelerator. This process may reduce the execution time by minimizing the number of accesses to the memory. The pre-fetcher may also pre-fetch the data in a manner that may improve performance. For example, when performing matrix multiplication A×B for matrices A and B, the values in a column of matrix A may be pair-wise multiplied with a row of matrix B, after which the pair-wise products may be summed. Thus, pre-fetcher may retrieve data in a particular order (retrieving matrix A in column order and matrix B in row order).

Finally, a pre-processor may perform pre-processing on the data. This pre-processing may include removing any zeroes (similar to the operation of the pruner). This pre-processing may also involve re-ordering the data to help address possible data dependencies by attempting to ensure that different operations that may involve the same element are performed in different cycles, which may factor in the latency of processing elements.

FIG. 1 shows a machine including an accelerator to extract features from a graph, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number (one or more) of storage devices in machine 105.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure.

Machine 105 may also include accelerator 135 (which may also be termed a device). As discussed below, accelerator 135 may support feature extraction from graphs (which may be stored in memory 115 or storage device 120, or on another machine accessed across a network (not shown in FIG. 1). Accelerator 135 is shown as communicating with memory 115, but if the graph is stored somewhere other than memory 115, accelerator 135 may communicate with the other storage location (such as storage device 120).

Accelerator 135 may be implemented using any desired hardware. For example, accelerator 135 may be implemented using a Field Programmable Gate Array (FPGA), an Application-Specific Integrated Circuit (ASIC), a central processing unit (CPU), a graphics processing unit (GPU), a general purpose GPU (GPGPU), a Data Processing Unit (DPU), or a Tensor Processing Unit (TPU), to name a few possibilities. Accelerator 135 may also use a combination of these elements to implement accelerator 135. Finally, accelerator 135 may be implemented as a computational storage unit, which may be used to support operations on storage device 120 (which may be beneficial if the graph is stored on storage device 120 rather than memory 115).

Machine 105 may also include pre-processor 140, which may be, for example, software executed by processor 110 or a component within accelerator 135. Pre-processor 140 may remove zeroes from the data and re-order the data to remove data dependencies. More generally, pre-processor 140 may modify the data in any desired manner: for example, re-ordering the data, changing values in the data, adding values to the data, and/or removing values from the data. Pre-processor 140 is discussed further with reference to FIG. 5 below.

Figure 2:
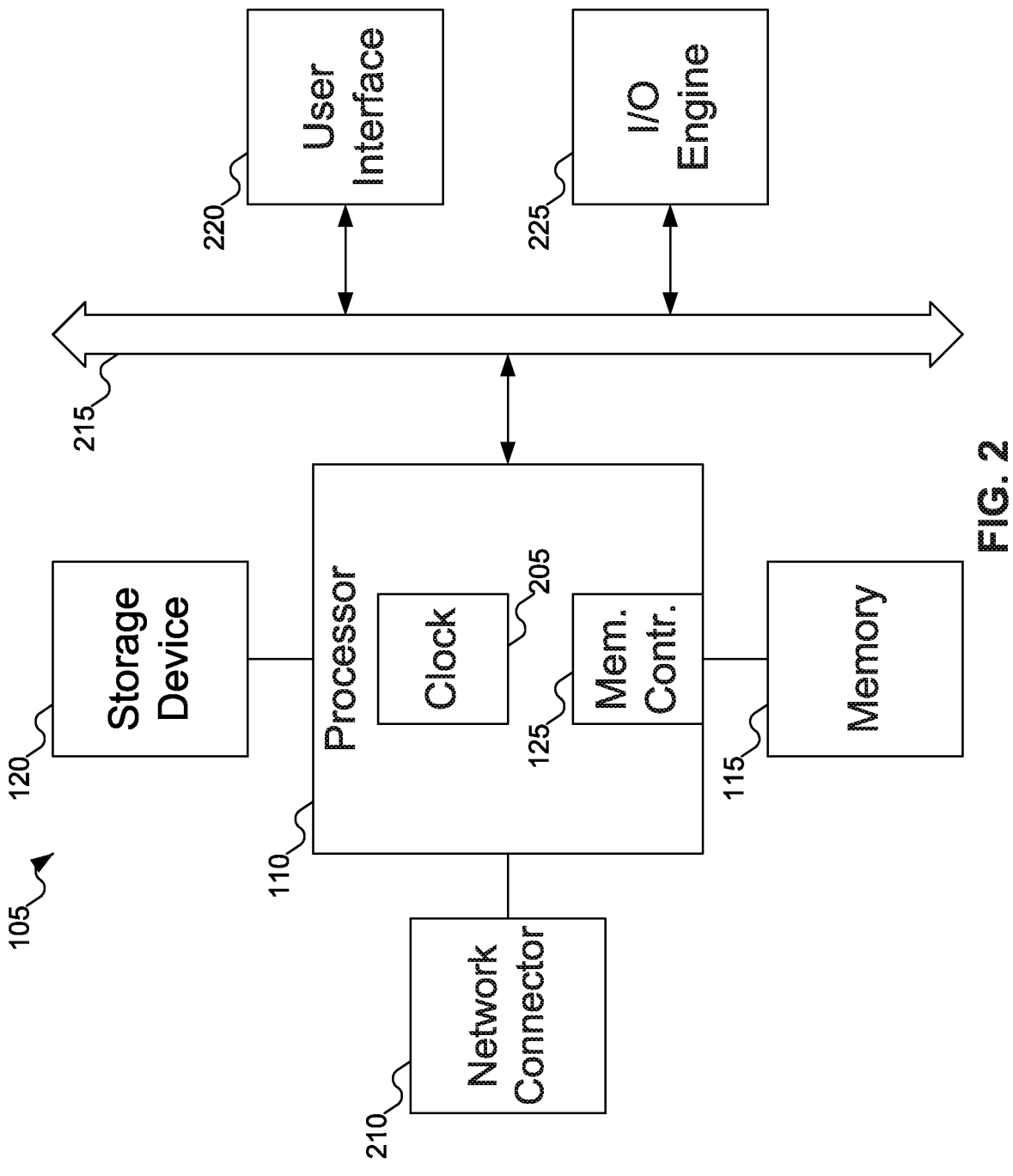
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
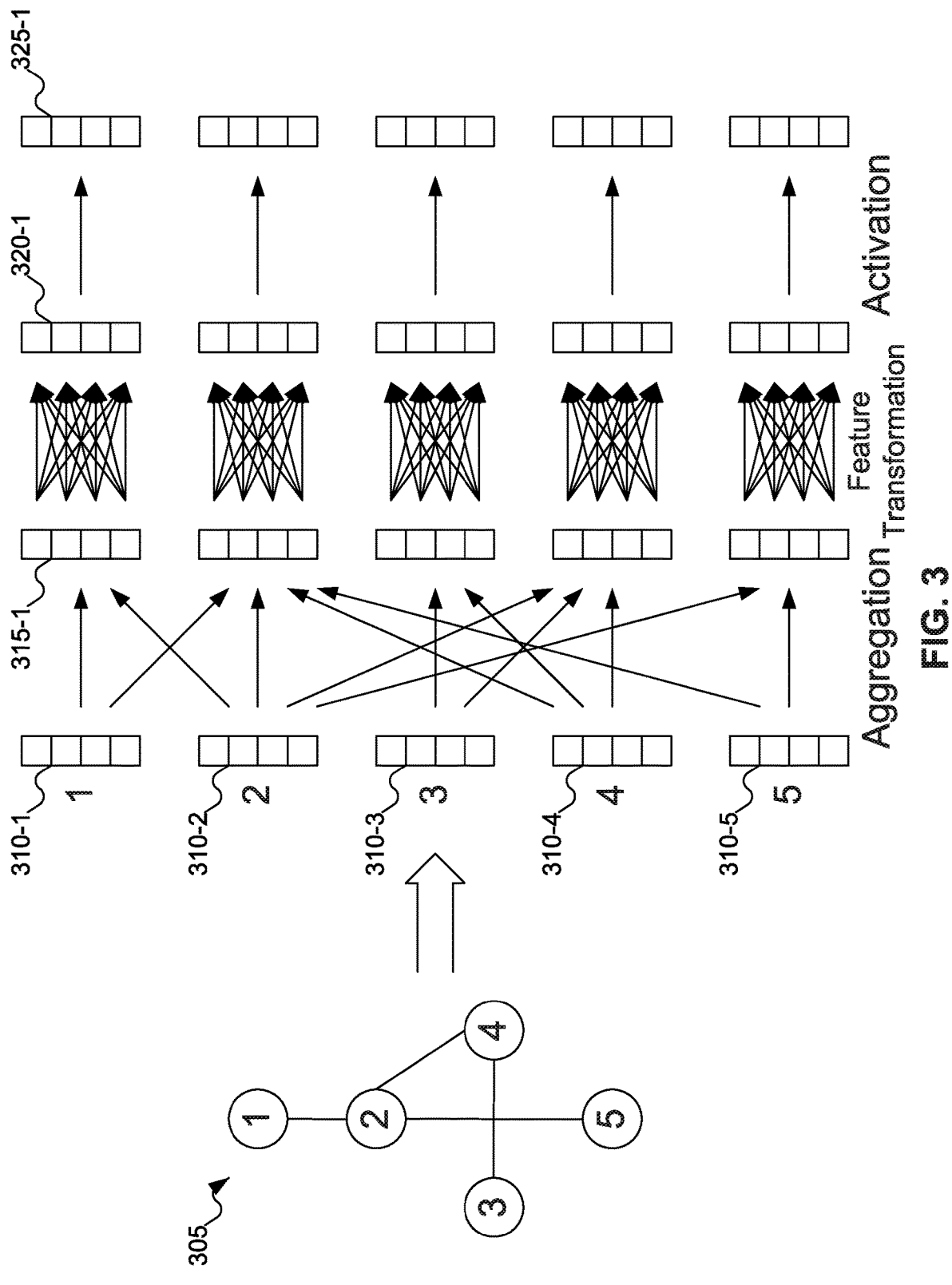
FIG. 3 shows a view of the process of feature extraction from an example graph, according to embodiments of the disclosure.

FIG. 3 shows a view of the process of feature extraction from an example graph, according to embodiments of the disclosure. In FIG. 3, graph 305 is shown. A graph like graph 305 may be thought of as a set of nodes and edges. Each node may be identified in some way, so as to distinguish two nodes in the graph. For example, graph 305 is shown as including nodes identified using numbers 1 through 5. Although not shown in FIG. 3, nodes may have weights associated with them (to indicate a cost of the node itself): the nodes in graph 305 are unweighted (which may be modeled as a weight of zero). Collectively, the weights may be identified as weight data.

Edges may connect nodes in the graph. For example, graph 305 has edges connecting nodes 1 and 2, nodes 2 and 4, nodes 2 and 5, and nodes 3 and 4. Although not shown in FIG. 3, edges may also have weights associated with them (to indicate a cost of traversing the node): the edges in graph 305 are unweighted (which may be modeled as a weight of zero).

In graph 305, the edges are undirected. That is, an edge may be traversed in either direction: for example, it does not matter if the edge connecting nodes 1 and 2 is used to traverse from node 1 to node 2, or from node 2 to node 1. But in some graphs, edges may be directed, meaning that the edge may be traversed only in one direction, from source to sink (or destination). A directed edge may be analogized to a one-way street, whereas an undirected edge may be analogized to a two-way street: a one-way street may be driven in only one direction, and to travel from the sink to the source may not be done backward along the directed edge.

In a city, not every pair of street intersections is connected by a street. In the same way, not every pair of nodes in a graph may have an edge connecting them. For example, in graph 305 there is no edge connecting nodes 1 and 3. A path may be understood as a sequence of edges (directed or undirected, depending on the type of edges in the graph) that connects pairs of nodes in a sequence, enabling traversal from a source node to a sink node. For example, in graph 305 there is a path from node 1 to node 3 by traversing the edges between nodes 1 and 2, nodes 2 and 4, and nodes 3 and 4, even if there is no edge connecting nodes 1 and 3 directly.

If every pair of nodes in an undirected graph include some path that connects them, then the graph may be termed a connected graph; otherwise, the graph may be termed disconnected. Graph 305 is an undirected graph, and as may be seen, there is a path connecting any two nodes in graph 305: thus, graph 305 is a connected graph. For directed graphs, the terminology is slightly different: a directed graph may be termed weakly connected if there is an undirected path (that is, a sequence of edges, but ignoring the edge directions) connecting any two nodes, and may be termed strongly connected if there is a directed path (that is, a sequence of edges that considers the direction of the edges) connecting any two nodes; if there is a pair of nodes for which no directed or an undirected path connects the nodes, then the directed graph may be termed disconnected. Note that any directed graph that is strongly connected is also weakly connected: the reverse is not necessarily true. Also note that for a directed graph, the existence of a directed path from node A to node B does not necessarily mean that there exists a directed path from node B to node A, which must be checked separately to determine if the directed graph is strongly connected.

In a computer system, graphs may be represented as a list of node identifiers (which may be paired with weights, if the nodes are weighted) and a list of edges pairing the two nodes that are connected by the edge (which may also be paired with weights, if the edges are weighted). These lists may be represented using any desired data structure: for example, linked lists, arrays, tables, etc. are various data structures that may be used to store the information that represents the graph. For directed graphs, the order of the nodes may represent the direction: for example, an edge represented using the pair (A, B) may be understood to represent an edge with node A as the source node and node B as the sink node. For undirected graphs, a single pair (A, B) may be used to represent the edge, or two pairs (A, B) and (B, A) may be used so that the order of the nodes does not affect searching for an edge. Note that edges may also be represented using a two-dimensional table, with a one (or a weight) representing the presence of an edge between the associated nodes (identified by the row and column of the value), and a zero (or some other accepted value, such as an infinite (or very high) cost) may be used to represent the lack of an edge between the two associated nodes. When such a table is used, for an undirected graph, values indicating the presence of an edge may be stored twice, to represent both pairs (A, B) and (B, A): in other words, the table may be symmetric around one of the diagonals of the table. Such a table representing edges in a directed graph, on the other hand, might not be symmetric unless the graph includes every edge in each direction.

FIG. 4A shows a first way to represent graph 305 of FIG. 3 in a computer system, according to embodiments of the disclosure. In FIG. 4A, graph 305 of FIG. 3 is shown as including list 405 of nodes, and list 410 of edge pairs. Note that in list 410, each edge of graph 305 of FIG. 3 is represented twice, once for each "direction" (since graph 305 of FIG. 3 is undirected). This may simplify finding a path through graph 305 of FIG. 3: if a search through graph 305 of FIG. 3 is currently at node 2 and looking to reach node 1, list 410 may be searched for an edge between nodes 2 and 1 without having to reverse their order. But if it is desirable to reduce the storage space to represent the graph, then list 415 of FIG. 4B may be used instead (but in that case, searching through graph 305 of FIG. 3 may involve searching for edges that include the current node as either the source or sink of each edge).

FIG. 4C shows a third way to represent graph 305 of FIG. 3 in a computer system, according to embodiments of the disclosure. In FIG. 4C, list 405 of nodes is the same as in FIGS. 4A and 4B. But instead of storing the edges as list 410 of FIG. 4A or 415 of FIG. 4B, table 420 may be used. Each row and column in table 420 includes an identifier for each node in list 405. For each pair of nodes, one node identifier may be used to select a row in table 420, and the other node identifier may be used to select a column in table 420. At the intersection of that row and that column, a value of one may indicate that the nodes are connected by an edge; a value of zero may indicate that the nodes are not connected. Note, as discussed above, that table 420 is symmetric around the main diagonal of table 420 (running from row one, column five to row five, column five): whatever value may be found in row i, column j may also be found in row j, column i.

Returning to FIG. 3, because nodes may be assigned different identifiers in different graphs, nodes may be identified in different orders in different graphs, edges may be presented in different orders in different graphs, edges may be assigned different weights in different graphs, etc., it may be difficult to compare two graphs to determine if they are similar. For example, two graphs with the same sets of nodes and edges, but where one graph has weights assigned to the edges that are twice the value of the weights assigned to the edges in the other graph, may not appear to be similar. But multiplying the edge weights by a constant value does not change the least-cost path between two nodes: the least-cost path P in one graph is the same least-cost path in the other graph. Similarly, changing the node identifiers may make the graphs appear different, but the least-cost paths remain the same.

Using graph convolutional networks (GCNs), it may be possible to extract features of graph 305. These features may then be compared with features of other graphs to determine if the graphs are similar, even though the graphs might use different identifiers, different orders of information, different weights, etc. GCNs may also be used in deep learning techniques, machine learning, artificial intelligence, etc. GCNs may be used to extract the node embeddings in a graph, where each node embedding may contain information on the role of its respective node in the graph. A GCN may consist of multiple layers in which the embeddings of the nodes are propagated within them until rich information of the input graph is derived. In each layer, the node embeddings may be updated by gathering their neighbors' embeddings (Aggregation) and passing their weighted summation through a filter (Feature Transformation). To introduce non-linearity to the model, an activation function in the form of rectified linear unit (ReLU) may be used at the end of each layer.

FIG. 3 illustrates this process. Node embeddings 310-1 through 310-5 (which may be referred to collectively as node embeddings 310) may be established, respectively, for each of the nodes in graph 305. Node embeddings 310 may be thought of as vectors of some pre-determined length. Node embeddings 310 may be initially assigned random values as the coordinates of the vector, letting the GCN establish their final values, or more specific values may be assigned to node embeddings 310. While FIG. 3 shows each node embedding as including four coordinates/values, embodiments of the disclosure may include any number (one or more) of coordinates/values in a node embedding.

In aggregation, the node embeddings are updated based on the node embeddings of neighbor nodes (that is, the nodes connected to a given node by an edge). Thus, for example, in graph 305 node 1 is a neighbor of node 2, node 2 is a neighbor of nodes 1, 4, and 5, node 3 is a neighbor of node 4, node 4 is a neighbor of nodes 2 and 3, and node 5 is a neighbor of node 2. Note that a node is also a neighbor of itself (even though there might not be an edge representing this relationship in graph 305). Thus, for example, node embedding 315-1 for node 1 is updated based on node embeddings 310-1 and 310-2.

In feature transformation, a weighted summation of the node embeddings may be passed through a filter. This feature transformation may consider the values of all coordinates within the node embedding. Thus, for example, node embedding 320-1 may be the result of feature transformation of node embedding 315-1.

Finally, the node embeddings may be subject to activation. Activation may involve a rectified linear unit (ReLU), which may introduce non-linearity into the model. In addition, activation may involve eliminating any non-positive values in the node embeddings, by replacing non-positive values with zeroes. Thus, node embedding 325-1 may be the result of applying a ReLU to node embedding 320-1 and eliminating any non-positive values from node embedding 320-1.

While FIG. 3 shows the process of aggregation, feature transformation, and activation occurring only once, embodiments of the disclosure may support any number (one or more) iterations of this sequence: each such sequence may be termed a layer. Thus, for example, node embedding 325-1 may be used as the input for node 1 in an activation operation in a second layer, with the results of activation of other node embeddings similarly being used as input to an activation operation in a second layer. Note that if multiple layers are performed, embodiments of the disclosure may enable varying parameters within the layer. For example, different weights may be used in different layers, different aggregation, feature transformation, and/or activation operations may be used in different layers, and so on.

Figure 5:
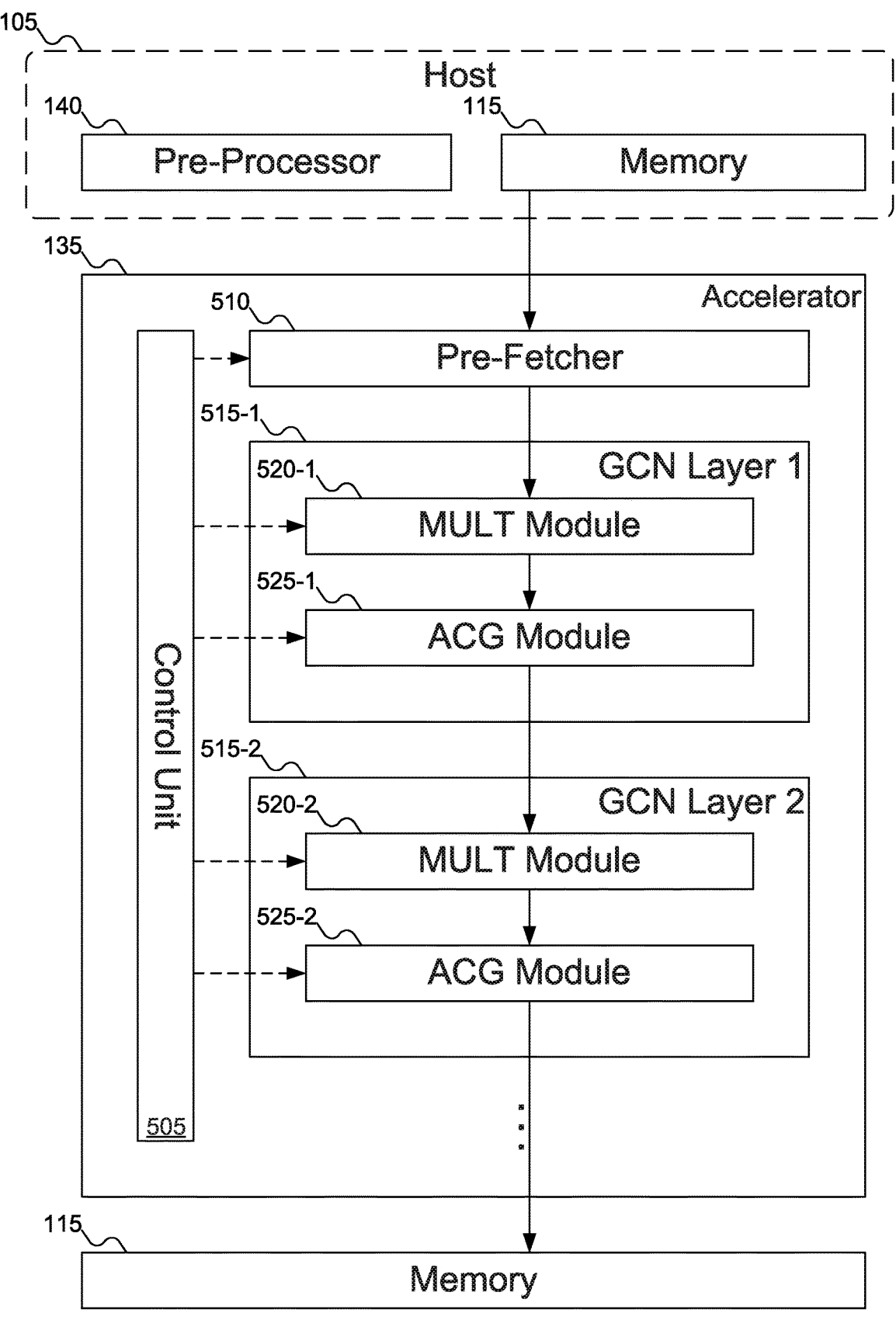
FIG. 5 shows the accelerator of FIG. 1 that may be used to extract features from the graph of FIG. 3, according to embodiments of the disclosure.

FIG. 5 shows accelerator 135 of FIG. 1 that may be used to extract features from graph 305 of FIG. 3, according to embodiments of the disclosure. In FIG. 5, accelerator 135 is shown as including control unit 505, pre-fetcher 510, and GCN layers 515-1 and 515-2 (which may be referred to collectively as GCN layers 515 or just layers 515). Control unit 505 may signal pre-fetcher 510 and GCN layers 515 to execute certain operations. To distinguish data flow from control flow, data flow is shown using solid arrows, and control flow is shown using dashed arrows.

As mentioned above, pre-fetcher 510 may fetch data for the graph from memory 115 (or storage device 120 of FIG. 1 or some other component if the data for the graph is stored therein, and even potentially from some storage within accelerator 135). Pre-fetcher 510 may store data in one or more buffers (not shown in FIG. 5), such as on-chip buffers or caches, in accelerator 135. In this manner, load or store requests to memory 115 may be minimized with data being transferred between components internally to accelerator 135, which may result is faster overall operation. Pre-fetcher 510 may operate to load data from memory 115 in a manner that may be most efficient for the operations of pre-fetcher 510. As discussed above, since matrix multiplication may involve multiplying a column of one matrix with a row of another matrix, pre-fetcher 510 may load data for the graph from memory 115 in a manner that reads some data (for example, node embeddings) in column order and other data (for example, weights) in row order, to expedite matrix multiplication.

The buffers into which pre-fetcher 510 may load data may include one or more first in, first out (FIFO) queues (not shown in FIG. 5). Pre-fetcher 510 may store data values in the FIFO queues in a round robin fashion, with the first value being placed in the first FIFO queue, the second value being placed in the second FIFO queue, and so on. The FIFO queues are discussed further with reference to FIG. 6 below.

In some embodiments of the disclosure, the buffers into which pre-fetcher 510 may load data may be sufficient in size to store all data for the graph. In such embodiments, the graph may be relatively small. If the graph is of sufficient size, the buffers in accelerator 135 might be insufficient to store all of the data for the graph. In such embodiments of the disclosure, pre-fetcher 510 may pre-fetch as much data for the graph as possible (while optimizing operations as much as possible), and may leave other data in memory 115 to be retrieved later: for example, when some data from the buffers in accelerator 135 has been processed and is no longer needed. If the buffers in accelerator 135 are not large enough to store all the data for the graph, accelerator 135 may write some data back to memory 115 to free up space in the buffers for other data, which may necessitate reading that data back from memory 115 at a later time.

GCN layers 515 may include two modules: multiplication modules 520-1 and 520-2 (which may be referred to collectively as multiplication modules 520) and accumulate and aggregate (ACG) modules 525-1 and 525-2 (which may be referred to collectively as ACG modules 525). Multiplication modules 520 may perform a matrix multiplication, and ACG modules 525 may perform an accumulate and aggregate operation. Together, multiplication modules 520 and ACG modules 525 may implement a feature transformation. ACG modules 525 may also perform activation, which may include a non-linear function applied to the node embeddings.

Multiplication modules 520 and ACG modules 525 may begin operations as soon as they have enough data from their sources to begin. For example, multiplication module 520-1 does not have to wait for pre-fetcher 510 to pre-fetch all the data for the graph from memory 115: provided enough data has been pre-fetched that multiplication module 520-1 may begin, multiplication module 520-1 may begin operation at any time. Similarly, ACG module 525-1 does not need to wait for multiplication module 520-1 to complete all of its operations: all that is needed is that multiplication module 525-1 has enough data to begin its operations. Similarly, GCN layer 515-2 does not need to wait until ACG module 525-1 has completed its operations to begin, provided enough data is available. This concept is discussed further with reference to FIGS. 6-9 below.

FIG. 5 shows accelerator 135 as including two GCN layers 515. But embodiments of the disclosure may include any number (one or more) of GCN layers 515, with three to four GCN layers being typical, and with eight GCN layers as a reasonable (but not limiting) upper bound. Once the last GCN layer 515 has completed its processing, the last GCN layer 515 may write its output back to memory 115 (or a different storage location, as desired), for later use in other processing. In addition, while FIG. 5 suggests that each layer may be separate from other layers (and include its own multiplication module 520 and/or ACG module 525), embodiments of the disclosure may include feeding data output from one GCN layer 515 back into itself for another iteration. Such embodiments of the disclosure may reduce the hardware used in accelerator 135 by reusing the implementation of GCN layers 515.

Host machine 105, aside from including memory 115, may also include pre-processor 140. Pre-processor 140 may read data for the graph from memory 115 and may pre-process the data. This pre-processing may include removing zeroes (or other values) from the data (to avoid unnecessary calculations), adding values to the data, changing values in the data, and/or re-ordering the data so that multiple data operations that might update the same value may be executed in cycles sufficiently far enough apart to avoid data dependencies, as data dependencies may result in a slower overall operation. Determining how far apart data may be moved may be a function of the number of cycles needed for a processing to complete its operation on a particular data. For example, if it takes five cycles (this number is selected arbitrarily for purposes of the example, and may be replaced with other numbers as desired/appropriate) for a processing element to complete its operation, pre-processor 140 may re-order data that might update the same value so that the data may be at least five cycles away from each other in terms of processing. Pre-processor 140 may store the pre-processed data back into memory 115, or into another storage location: for example, storage device 120 of FIG. 1, or storage within accelerator 135 (not shown in FIG. 5).

While FIG. 5 shows pre-processor 140 and memory 115 as being in machine 105, embodiments of the disclosure may locate pre-processor 140 and/or memory 115 in other locations. For example, pre-processor 140 and/or memory 140 may be implemented within accelerator 135. That is, accelerator 135 may include a component (such as a dedicated FPGA, ASIC or other equivalent component) that may implement the operations of pre-processor 115. Or, some other component of accelerator 135, such as a pruner in ACG module 525, may be used to carry out the operations of pre-processor 140. Or, accelerator 135 may include a processor (for example, as part of control unit 505) that may execute software to implement the operations of pre-processor 140. That FIG. 5 shows pre-processor 140 and memory 115 as being part of machine 105 is merely an exemplary placement of pre-processor 140 and memory 115. In addition, the elements of accelerator 135 (control unit 505, pre-fetcher 510, multiplication modules 520, and ACG modules 525) may be individually implemented as software, hardware, or a combination of both. For example, control unit 505 may be implemented as an FPGA, pre-fetcher 510 may be implemented as an ASIC, and multiplication modules 520 and ACG modules 525 may be implemented using software to be executed by a processor.

Figure 6:
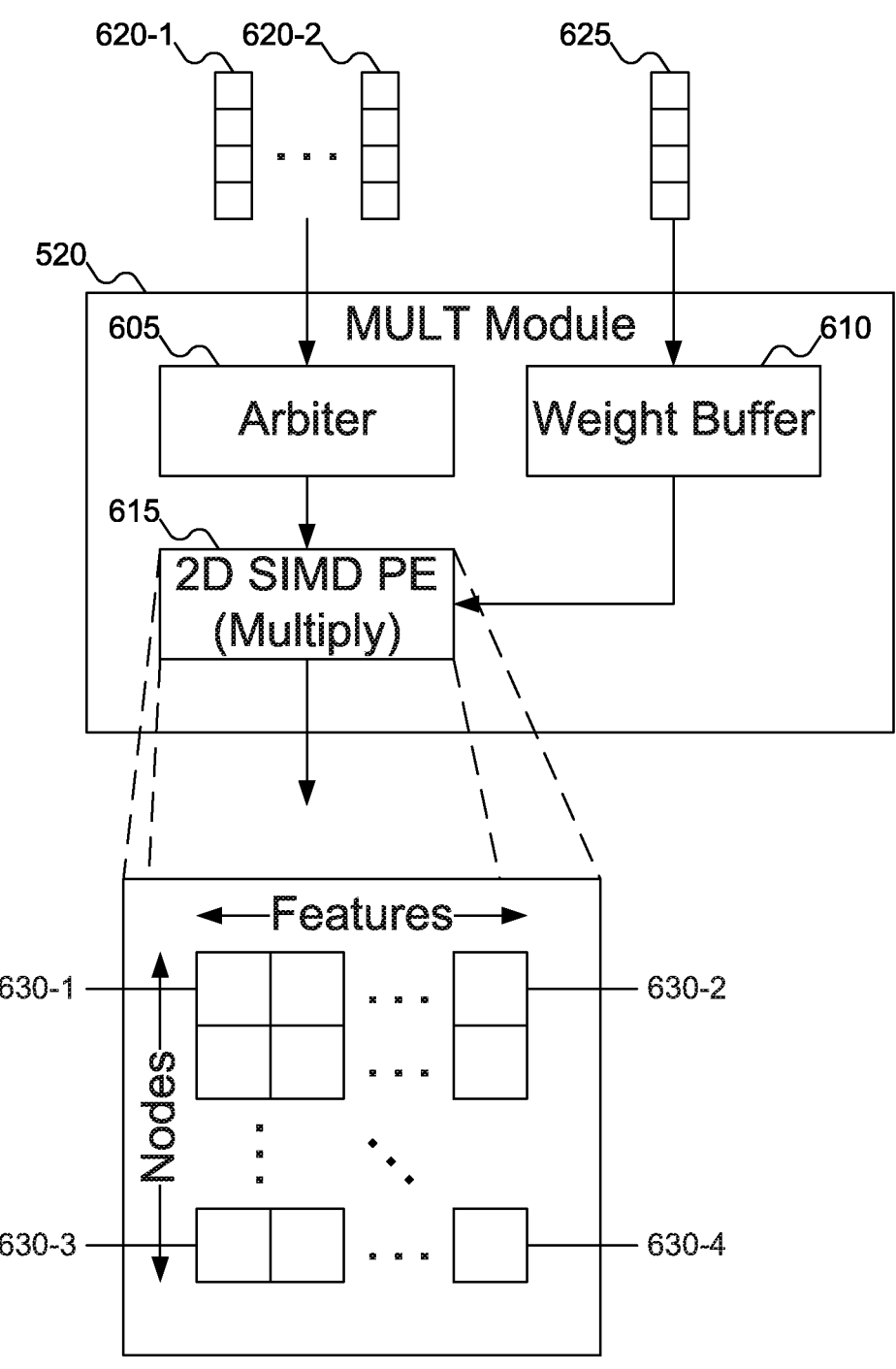
FIG. 6 shows details of the multiplication module of FIG. 5, according to embodiments of the disclosure.

FIG. 6 shows details of multiplication module 520 of FIG. 5, according to embodiments of the disclosure. In FIG. 6, multiplication module 520 may include arbiter 605, weight buffer 610, and two-dimensional (2D) single instruction, multiple data processing element (SIMD PE) 615.

Arbiter 605 may select values to be processed by 2D SIMD PE 615 from FIFO queues 620-1 through 620-2 (which may be referred to collectively as FIFO queues 620). The values may be placed in FIFO queues 620 by pre-fetcher 510 of FIG. 5 (if multiplication module 520 is in the first GCN layer 515 of FIG. 5 of accelerator 135 of FIG. 1) or by a pruner that is part of ACG module 525 of FIG. 5. The pruner is discussed further with reference to FIG. 9 below.

The reason to include FIFO queues 620 may not be apparent. After all, if pre-processor 140 of FIG. 1 has properly pre-processed the data for the graph, then the data for the graph should not contain any zeroes and should be re-ordered so that no data dependencies exist. But while that fact may be true after pre-processor 140 of FIG. 1 has pre-processed the data, that fact might not be true in subsequent GCN layers. That is, in GCN layer 515-2 of FIG. 5, multiplication module 520-2 might access data that includes zeroes, or now has data dependencies. The pruner that is part of ACG module 525 of FIG. 5, as discussed with reference to FIG. 9 below, may eliminate zeroes from the data for the graph for use in subsequent GCN layers 515 of FIG. 5, but data dependencies might still exist. By using FIFO queues 620, if arbiter 605 determines that a data dependency exists, arbiter 605 may leave that data in its FIFO queue for one or more cycles, to try and resolve the data dependency. Data dependencies are discussed further with reference to FIG. 7 below.

The number of FIFO queues 620 may vary, depending on the implementation. In some embodiments of the disclosure, the number of FIFO queues 620 may be equal to or exceed the number of PEs in 2D SIMD PE 615.

Arbiter 605 may read data from FIFO queues 620. If the data is non-zero (which it ought to be, if pre-processor 140 of FIG. 5 and the pruner of ACG module 525 of FIG. 9 have operated correctly), then arbiter 605 may determine whether a particular value would update data that is already being updated by another processing element. If so, then arbiter 605 may insert a bubble (that is, instruct the processing element that would have been handling that value) to do no operation (a no-op) instead. The operations of arbiter 605 are discussed further with reference to FIG. 8 below.

Weight buffer 610 may store information about weights 625 (which may also be termed weight data) used in the feature transformation. Weights 625 may be pre-fetched by pre-fetcher 510 of FIG. 5 so that they may be accessed from within accelerator 135 of FIG. 1 (rather than being read from memory 115 of FIG. 1). While FIG. 6 suggests that weights 625 may be just a vector (a one-dimensional set of weights), embodiments of the disclosure may include weights 625 as two-dimensional data (with the data being provided to multiplication module 615 according to some ordering).

2D SIMD PE 615 may be a two-dimensional array of processing elements. As the name implies, the same instruction(s) may be applied to each processing element in 2D SIMD PE 615, but applied to different data. As seen in the blowup of the figure, 2D SIMD PE 615 may include processing elements 630-1, 630-2, 630-3, and 630-4 (which may be referred to collectively as processing elements 630). Processing elements 630-1 through 630-2 may form a row of processing elements in 2D SIMD PE 615, with other rows formed by other processing elements (up through the row including processing elements 630-3 through 630-4). In addition, processing elements 630-1 through 630-3 may form a column of processing elements in 2D SIMD PE 615, with other columns formed by other processing elements (up through the column including processing elements 630-2 through 630-4).

Each processing element 630 in 2D SIMD PE 615 may, for example, perform one multiplication as part of an overall matrix multiplication. 2D SIMD PE 615 is functionally equivalent to a set of one-dimensional row-oriented SIMD PEs (as may be formed by processing elements 630-1 through 630-2 or processing elements 630-3 through 630-4), a set of one-dimensional column-oriented SIMD PEs (as may be formed by processing elements 630-1 through 630-3 or processing elements 630-2 through 630-4), or even just a set of SIMD PEs without any "dimensional organization". The term 2D SIMD PE should be understood as including such sets.

Once arbiter has assigned operations to processing elements in 2D SIMD PE 615, 2D SIMD PE 615 may begin its operations, even if there might be other data waiting to be loaded and processed (that is, values still in FIFO queues 620). This may occur potentially even if not every processing element in 2D SIMD PE 615 has had values loaded into it for processing. For example, it may be that processing element 630-1 may be able to perform its computation even if processing elements 630-2, 630-3, and 630-4 do not yet have their data. But eventually, 2D SIMD PE 615 should output one value for each processing element (at least, within each interval used by 2D SIMD PE 615 to process values: each GCN layer may involve multiple such intervals to complete all computations).

In some embodiments of the disclosure, it may be possible to provide data from FIFO queues 620 and/or weights 625 to two or more processing elements 630 at the same time. In such embodiments of the disclosure, processing elements 630 may be able to begin their computations at the same time. But in some embodiments of the disclosure, providing data to processing elements 630 is done one processing element at a time, with each processing element 630 receiving its data in a different cycle. In such embodiments of the disclosure, different processing elements 630 may start computations at different times.

At this point, it may be helpful to clarify some terminology. The term "cycle" is meant to refer to the time required by the hardware used to implement accelerator 135 of FIG. 1 to carry out a single instruction (similar to a cycle of a CPU). Note that while a cycle may depend on the underlying hardware, a cycle is a unit of time. For example, a processor that operates at 200 megahertz (MHz) performs 200,000,000 cycles per second, which means that each cycle is 0.000000005 seconds (which may also be expressed as $5 \times 10^{-9}$ seconds, or 5 nanoseconds (ns)). The term "interval" is meant to refer to the time required for such a processor to complete a particular sequence of operations, each of which may require one or more cycles to complete. For example, the time required for processing elements 630 to perform computations on input data might take five cycles: this number of cycles may be understood to be an interval. (As above, the number five used above is merely exemplary, and the number of cycles used by processing elements 630 to perform computations may be greater or smaller than five.) The term "iteration" is meant to refer to the operation of GCN layers 515 of FIG. 5. A particular GCN layer 515 of FIG. 5 may take a single iteration to carry out its operations. Note that in some embodiments of the disclosure a single GCN layer 515 of FIG. 5 may be used multiple times (for example, if the operations performed in two GCN layers are identical but for the data on which the operations are performed): each such use of GCN layer 515 of FIG. 5 may be thought of as an iteration. Thus, an iteration may involve one or more intervals, and an interval may involve one or more cycles.

Figure 7:
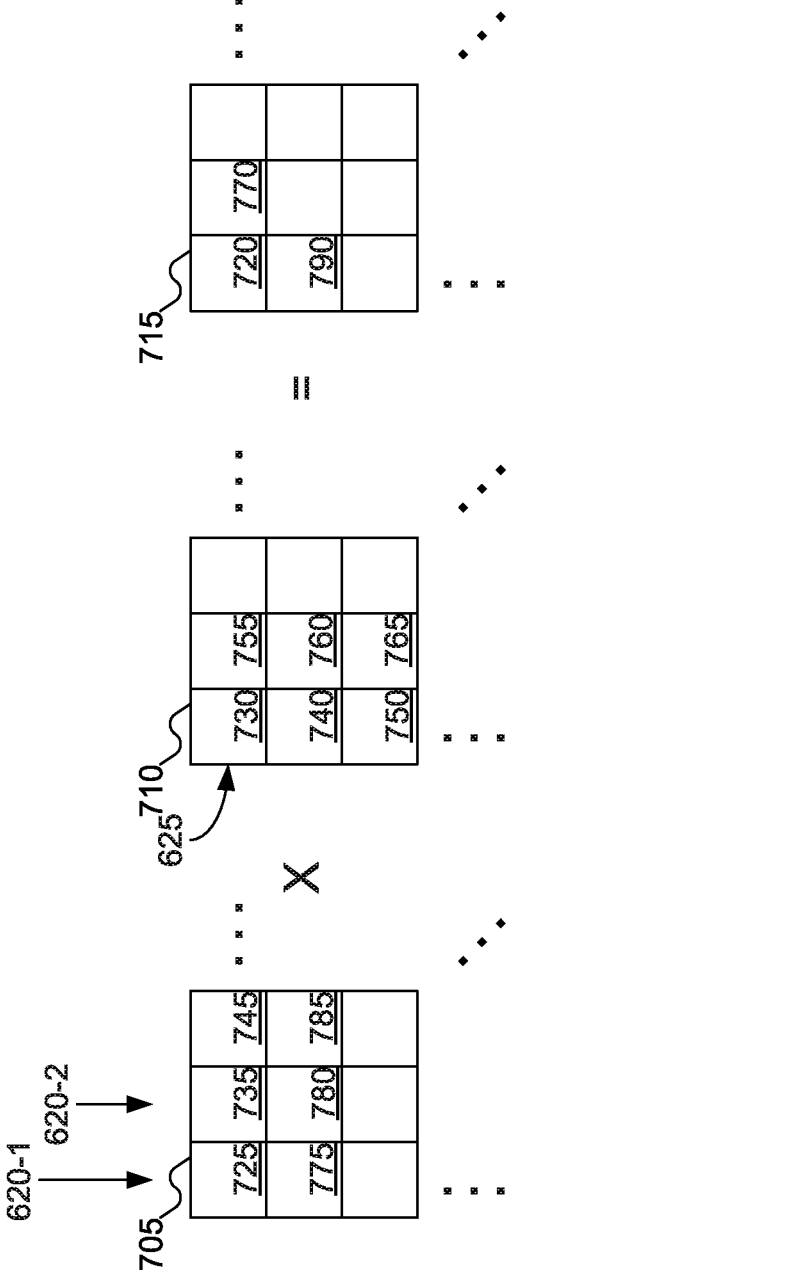
FIG. 7 shows various processing elements that may update the same location, according to embodiments of the disclosure.

It has been mentioned above both that processing may begin as soon as sufficient data has been loaded and that data dependencies may exist. FIG. 7 illustrates how these situations may occur.

Consider the situation where an outer-product matrix multiplication is being performed on matrices 705 and 710, to produce matrix 715. To determine output value 720, values 725 and 730 are multiplied, then values 735 and 740 are multiplied, then values 745 and 750 are multiplied, and so on. Once all these individual multiplications have been performed, the results may be summed, which is output value 720.

When performing the mathematics manually, consideration is generally not given to the process. But when the calculation is performed by a machine, there are a number of different computations that may be updating a particular location. More particularly, processing elements 630 of FIG. 6 that are involved in updating output value 620 may operate by individually multiplying a pair of input values (such as values 725 and 730, values 735 and 740, and values 745 and 750), then using the product to increase output value 720. But increasing output value 720 may involve reading output value 720 into processing elements 630 of FIG. 6, performing the addition, then writing the updated value back to output value 720. If two (or more) processing elements 630 of FIG. 6 attempt this update at the same time, the result might be incomplete. For example, both processing elements might read output value 720 at the same time and independently write their values back out. Whichever write operation completes second may therefore miss the update by the first write operation, resulting in an incorrect value. Thus, there may be a data dependency between those two computations.

The solution to this data dependency may be to schedule calculations that update output value 720 in different intervals. That is, one interval may update output value 720 based on the product of values 725 and 730, the next interval may update output value 720 based on the product of values 735 and 740, the next interval may update output value 720 based on the product of values 745 and 750, and so on. In this manner, data dependencies may be addressed.

With this information, the operation of pre-processor 140 of FIG. 1, in terms of re-ordering data for the graph, may be understood. Assume that 2D SIMD PE 615 of FIG. 6 includes n processing elements 630. If two different values may be used to update the same value, then the two values have a data dependency. If the two different values are within n values of each other in the order of the data, then both values could end up being processed in the same interval. Since this situation could result in incorrect calculations (due to the possibility of one update being lost when another update to the same value in the same interval occurs), it is helpful for different values that are used to update the same value be in different intervals. The values may be spaced far enough apart that two processing elements may avoid updating the same value at the same time: this result may be achieved, for example, by spacing the values at least n×l values apart, where l is the number of cycles a processing element may need (that is, the length of an interval, or alternatively the latency of the processing element) to process a value.

Values 725, 735, and 745, in combination with values 755, 760, and 765, may also be used to update output value 770; and value 775, 780, and 785, in combination with values 730, 740, and 750, may be used to update output value 790. These operations do not affect computations to update output value 720. Thus, while updates to output value 720 may be calculated in non-overlapping intervals to avoid data dependencies, there is no problem with performing operations on, for example, values 725 and 730, values 725 and 755, and values 775 and 730 in parallel, as these operations update output values 720, 770, and 790 respectively (with similar parallel operations possible for other operations that do not update the same output values). In other words, one interval may involve operations on values 725 and 730, values 725 and 755, and values 775 and 730, to update values 720, 770, and 790 respectively, a later interval may involve operations on values 735 and 740, values 735 and 760, and values 780 and 740 to update values

720, 770, and 790 respectively, yet another later interval may involve operations on values 745 and 750, values 740 and 765, and values 785 and 750 to update values 720, 770, and 790 respectively, and so on. Note that these intervals may be non-overlapping: for example, if each interval includes five cycles, then the interval where values 735 and 740, values 735 and 760, and values 780 and 740 update values 720, 770, and 790, respectively, may start five cycles after the interval where values 725 and 730, values 725 and 755, and values 775 and 730, update values 720, 770, and 790 respectively, and five cycles before the interval where values 745 and 750, values 740 and 765, and values 785 and 750 update values 720, 770, and 790 respectively. Thus, data from FIFO queue 620-1 may be stored as value 725 in one processing element, data from FIFO queue 620-2 may be stored as value 750 in another processing element, and so on, to leverage available parallel computations.

Figure 8:
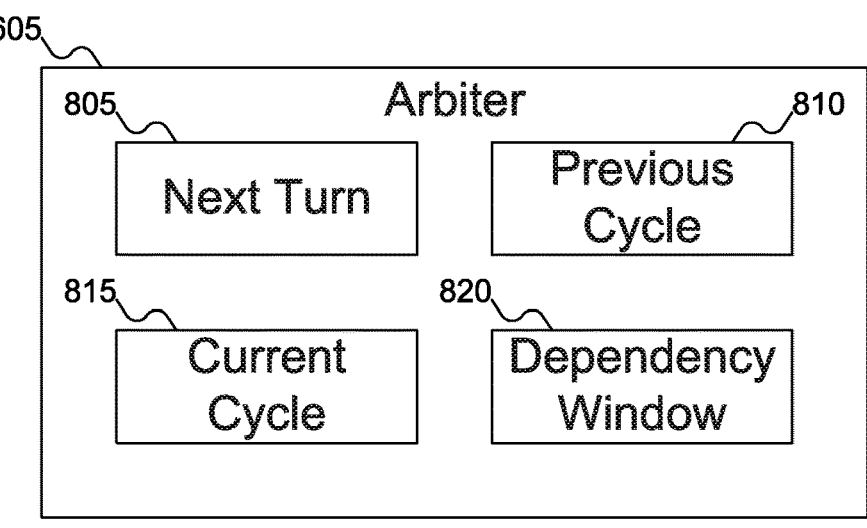
FIG. 8 shows details of the arbiter of FIG. 6, according to embodiments of the disclosure.

FIG. 8 shows details of arbiter 605 of FIG. 6, according to embodiments of the disclosure. In FIG. 8, arbiter 605 may include next turn identifier 805, previous cycle identifier 810, current cycle identifier 815, and dependency window 820. Next turn identifier 805 may identify the next FIFO queue 620 of FIG. 6 from which arbiter 605 may read data for processing.

It may be unclear why arbiter 605 would keep track of the next FIFO queue 620 from which to read data. After all, arbiter 605 might simply read data from each FIFO queue 620 in turn until all data has been read. Or, arbiter 605 might read data until all processing elements 630 of FIG. 6 have data, then wait for an interval to complete, then read more data to fill processing elements 630 of FIG. 6, again, and so in, in which case all arbiter 605 would need to know is how many processing elements 630 of FIG. 6 are in multiplication module 520 of FIG. 5. But these conclusions have some hidden assumptions that are not necessarily correct. In the first case, if the amount of data is greater than will fit in processing elements 630 of FIG. 6, then arbiter 605 may have to wait until it may read for data; or if arbiter 605 may read data from FIFO queue 620 faster than pre-fetcher 510 of FIG. 5 (for the first GCN layer 515 of FIG. 5) or ACG module 525 of FIG. 5 of the previous GCN layer (for later GCN layers 515 of FIG. 5) may provide the data. In that case, arbiter 605 may have to remember which FIFO queue 620 should be read next: next turn identifier 805 may provide this information for when arbiter 605 may next read data from FIFO queues 620 of FIG. 6. In the second case, the assumption might be reasonable for the first GCN layer 515 of FIG. 5; but after the first GCN layer 515 of FIG. 5, it may be that new zeroes are in the data for the graph and may be skipped. If those zeroes should be identified by arbiter 605, those zeroes may be skipped, and arbiter 605 may actually access more values from FIFO queues 620 of FIG. 6 than there are processing elements 630 of FIG. 6. Thus, it is not reasonable to assume that in each cycle (or interval, depending on how many values may be provided to processing elements at the same time) arbiter 605 may read only as many values as there are processing elements 630 of FIG. 6.

In addition, the above discussion treats each processing element 630 of FIG. 6 as "locked" during its operation, unable to do anything else until it finishes its processing. But in some embodiments of the disclosure, processing elements 630 of FIG. 6 may operate in a pipelined manner. That is, processing elements 630 of FIG. 6 may be thought of as including two or more stages, each of which produces a partial or intermediary result, which is then used by the next stage of the pipeline. In such embodiments of the disclosure, it may be wasteful to let one stage of processing elements 630 of FIG. 6 do nothing while other stages of processing elements 630 of FIG. 6 are performing computations. For example, updating output value 720 of FIG. 7 may involve multiplying values 725 and 730 of FIG. 7, then reading the current value of output value 720 of FIG. 7, then increasing the current value of output value 720 of FIG. 7 by the product of values 725 and 730 of FIG. 7: this sum may then be written to output value 720 of FIG. 7 as the result. This sequence may be thought of as three stages: multiplying values 725 and 730 of FIG. 7; reading the current value of output value 720 of FIG. 7, and adding the current value of output value 720 of FIG. 7 and the product computed in stage 1 (there may be other ways to divide these operations into stages: embodiments of the disclosure are intended to include all such variations). But after values 725 and 730 of FIG. 7 have been multiplied, the first stage of processing elements 630 of FIG. 6 may be tasked to perform another multiplication of other values. Thus, processing elements 630 of FIG. 6 may receive data in each cycle, even if the interval required for processing element 630 of FIG. 6 to complete all its operations may be more than one cycle.

If multiple operations that might involve updating a particular output value were being processed at the same time, there could be a data dependency. For example, consider the situation where values 725 and 730 of FIG. 7 are input to a particular processing element 630 of FIG. 6 in one cycle, and values 735 and 740 of FIG. 7 are input to the same processing element 630 of FIG. 6 in the next cycle. At the same time that stage one is multiplying values 735 and 740 of FIG. 7, stage two may be reading output value 720 of FIG. 7 to increase output value 720 of FIG. 7 by the product of values 725 and 730 of FIG. 7. But in the next cycle, stage two of the particular processing element 630 of FIG. 6 may attempt to read output value 720 of FIG. 7 while stage three of the particular processing element 630 of FIG. 6 may be increasing output value 720 of FIG. 7 by the product of values 725 and 730 of FIG. 7. Depending on which operation happens "first" (despite the fact that the operations are meant to occur in parallel, the operations might occur in one order or the other, which might not be predictable), the "current" value of output value 720 of FIG. 7 read in stage two of the particular processing element 630 of FIG. 6 might or might not reflect the increase by the product of values 725 and 730 of FIG. 7 being performed in stage three of the particular processing element 630 of FIG. 6. In other words, the increase to output value 720 of FIG. 7 by the product of values 725 and 730 of FIG. 7 might be lost if stage two of the particular processing element 630 of FIG. 6 accesses output value 720 of FIG. 7 at the "wrong" time. In this situation, the various updates to output value 720 of FIG. 7 may be scheduled far enough apart (based on the latency of processing elements 630 of FIG. 6) to avoid such a data dependency. For example, the particular processing element 630 of FIG. 6 might be scheduled to update output value 720 of FIG. 7 in one cycle, then output value 790 of FIG. 7 in the next cycle, then output value 770 of FIG. 7 in the third cycle. At this point, any data in the particular processing element 630 of FIG. 6 would not be updating output value 720 of FIG. 7, and therefore there would not be a data dependency to schedule another update to output value 720 of FIG. 7.

Previous cycle identifier 810 may be used to determine the last cycle in which a particular feature was updated. Thus, previous cycle identifier 810 may be a vector, rather than a single value, storing information for each processing element 630 of FIG. 6. Current cycle identifier 815 may be used to determine the current cycle of multiplication module 520 of FIG. 5. Dependency window 820 may be determined using the number of cycles needed by processing elements 630 of FIG. 6 to finish computations (that is, the latency of processing elements 630 of FIG. 6). By comparing previous cycle identifier 810 with current cycle identifier 815 and dependency window 820, it may be possible to determine whether there may be a data dependency: if the difference between previous cycle identifier 810 for a particular feature and current cycle identifier 815 is less than or equal to dependency window 820, then it is possible that updating this feature could result in a data dependency. Arbiter 605 may then insert a bubble (a no-op) into the processing element rather than moving the value from FIFO queue 620 of FIG. 6 into processing element 630 of FIG. 6 and track that the value in question is waiting to be processed. But if the difference between previous cycle identifier 810 and current cycle identifier 815 is greater than dependency window 820, then arbiter 605 may load the value from FIFO queue 620 of FIG. 6 into processing element 630, and may update previous cycle identifier 810 for that feature to equal current cycle identifier 815. Note that if arbiter 605 inserts a bubble into processing element 630 of FIG. 6, this fact does not mean that the data is removed from FIFO queue 620 of FIG. 6: the data may remain in FIFO queue 620 of FIG. 6, or may be stored in a buffer within arbiter 605 until the data dependency has been resolved.

Current cycle identifier 815 may be updated based on clock 205 of FIG. 2 as cycles pass. Previous cycle identifier 810 may be updated at the time the arbiter 605 reads data from FIFO queues 620 of FIG. 6.

While it may seem that arbiter 605 may operate one value at a time, this assumption is not correct. In fact, arbiter 605 may access some set of values from FIFO queues 620 of FIG. 6 in parallel, and may store those values in processing elements 630 of FIG. 6 (or insert bubbles into processing elements 630 of FIG. 6) in parallel. Arbiter 605 may actually read enough values from FIFO queues 620 of FIG. 6 to fill 2D SIMD PE 615 of FIG. 6. Note that this number of values may be less than the number of processing elements 630 of FIG. 6. For example, as noted above, arbiter 605 may track certain values as not having been loaded into processing elements 630 of FIG. 6. These elements, already read from FIFO queues 620 of FIG. 6, are waiting for processing in the next iteration. Thus, if 2D SIMD PE 615 of FIG. 6 has n processing elements 630 of FIG. 3, and there are w elements waiting for processing (as described above), then arbiter 605 may only read n−w elements from FIFO queues 620 of FIG. 6: between those read elements and the w waiting elements, arbiter 605 will have enough values to fill processing elements 630 for another iteration.

Figure 9:
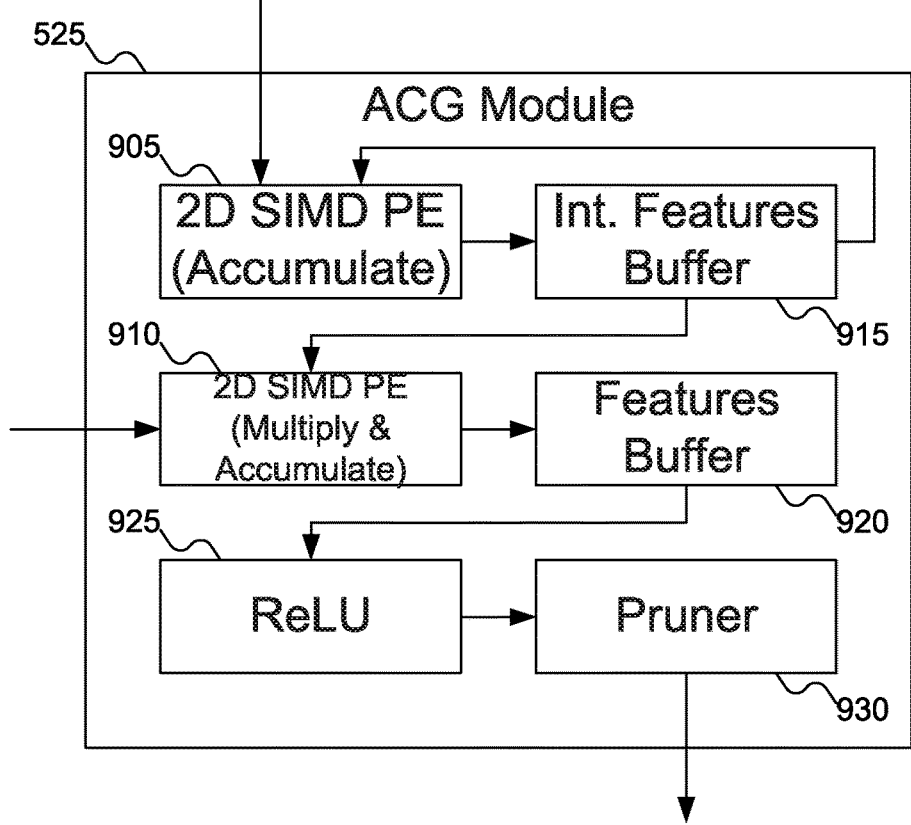
FIG. 9 shows details of the accumulate and aggregate (ACG) module of FIG. 5, according to embodiments of the disclosure.

FIG. 9 shows details of ACG module 525 of FIG. 5, according to embodiments of the disclosure. In FIG. 9, ACG module 525 is shown as including two 2D SIMD PEs 905 and 910, two buffers 915 and 920, ReLU 925, and pruner 930. 2D SIMD PEs 905 and 910 are similar to 2D SIMD PE 615 of FIG. 6, although 2D SIMD PEs 905 and 910 may carry out different operations: 2D SIMD PE 905 may perform an accumulate operation and 2D SIMD PE 910 may perform a multiply and accumulate operation (and operate on edge data for the graph rather than node data for the graph, as shown by the second data input to 2D SIMD PE 910). Similar to 2D SIMD PE 615 of FIG. 6, 2D SIMD PEs 905 and 910 may begin to operate as soon as there is sufficient data available, rather than waiting for all processing elements 630 of FIG. 6 in 2D SIMD PEs 905 and 910 to have data.

Buffers 915 and 920 may be used to store the outputs of 2D SIMD PEs 905 and 910 within ACG module 525 for further processing: as may be seen in FIG. 9, buffer 915 may store intermediate feature calculations from 2D SIMD PE 905 which may in turn be used as input to 2D SIMD PE 910, and buffer 920 may store feature calculations from 2D SIMD PE 910, which may in turn be used as input to ReLU 925.

At the end of each GCN layer 515 of FIG. 5, there may be an activation function. The activation function may be in the form of ReLU 925 may be used to activate features from buffer 920. ReLU 925 may use a non-linear function, such as, for example, a function that determines the maximum of the input value or zero, to perform activation.

Pruner 930 may prune any zeroes from the features as processed by ReLU 925. Note that ReLU 925 may replace negative values with zeroes; pruner 930 may then remove zeroes (or other values) from the data for the graph. Pruner 930 may also modify the data for the graph: for example, adding values or changing values. Pruner 930 may also place (non-zero) data for the graph in FIFO queues 620 of FIG. 6 for use in the next GCN layer 515 of FIG. 5.

Note that in some embodiments of the disclosure, the final GCN layer 515 of FIG. 5, the output of ACG module 525 may be complete: that is, with zeroes included. By including the zeroes in the output of ACG module 525, the feature extraction may be more complete (as later uses of the features may expect the zeroes to be present). Thus, pruner 930 might be omitted (or not used) in ACG module 525 of the final GCN layer 515 of FIG. 5. But in other embodiments of the disclosure, pruner 930 may operate even in ACG module 930 of the final GCN layer 515 of FIG. 5, provided enough information is provided for the zeroes to be reintroduced if needed (for example, by identifying which elements in the output matrix include the data output by pruner 930, or by identifying which elements in the output matrix would be zero).

Figure 10:
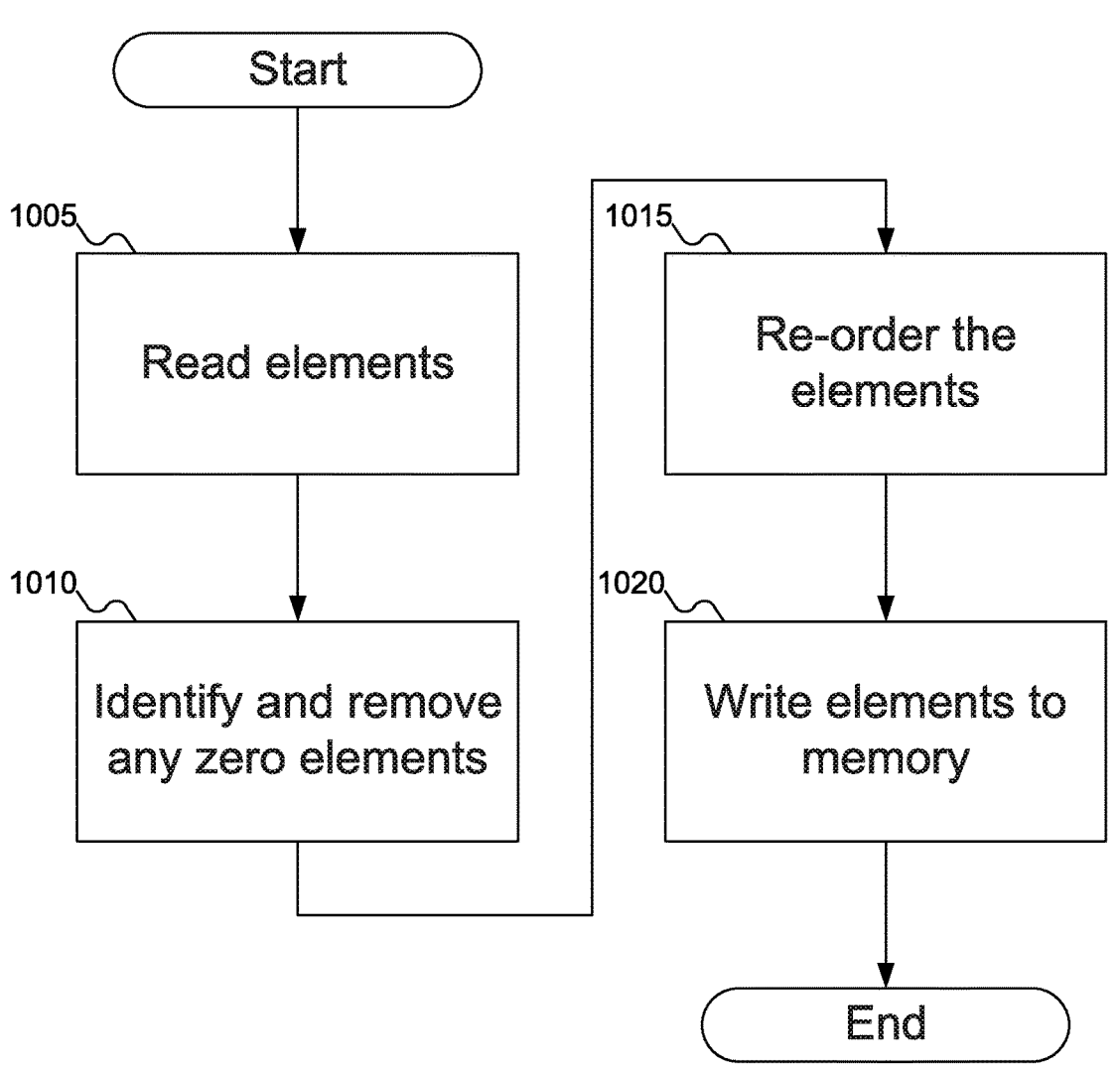
FIG. 10 shows an example flowchart of an example procedure for operations of the pre-processor of FIG. 1, according to embodiments of the disclosure.

FIG. 10 shows an example flowchart of an example procedure for operations of pre-processor 140 of FIG. 1, according to embodiments of the disclosure. In FIG. 10, at block 1005, pre-processor 140 of FIG. 1 may read elements from memory 115 of FIG. 1. At block 1010, pre-processor 140 of FIG. 1 may identify and remove any zero elements (or other values). Pre-processor 140 of FIG. 1 may also make other modifications to the data for the graph, such as changing values in the data or adding values to the data. At block 1015, pre-processor 140 of FIG. 1 may re-order elements so as to avoid any data dependencies. Finally, at block 1020, pre-processor 140 of FIG. 1 may write the pre-processed data for the graph back into memory 115 of FIG. 1, for reading by pre-fetcher 510 of FIG. 5.

Figure 11:
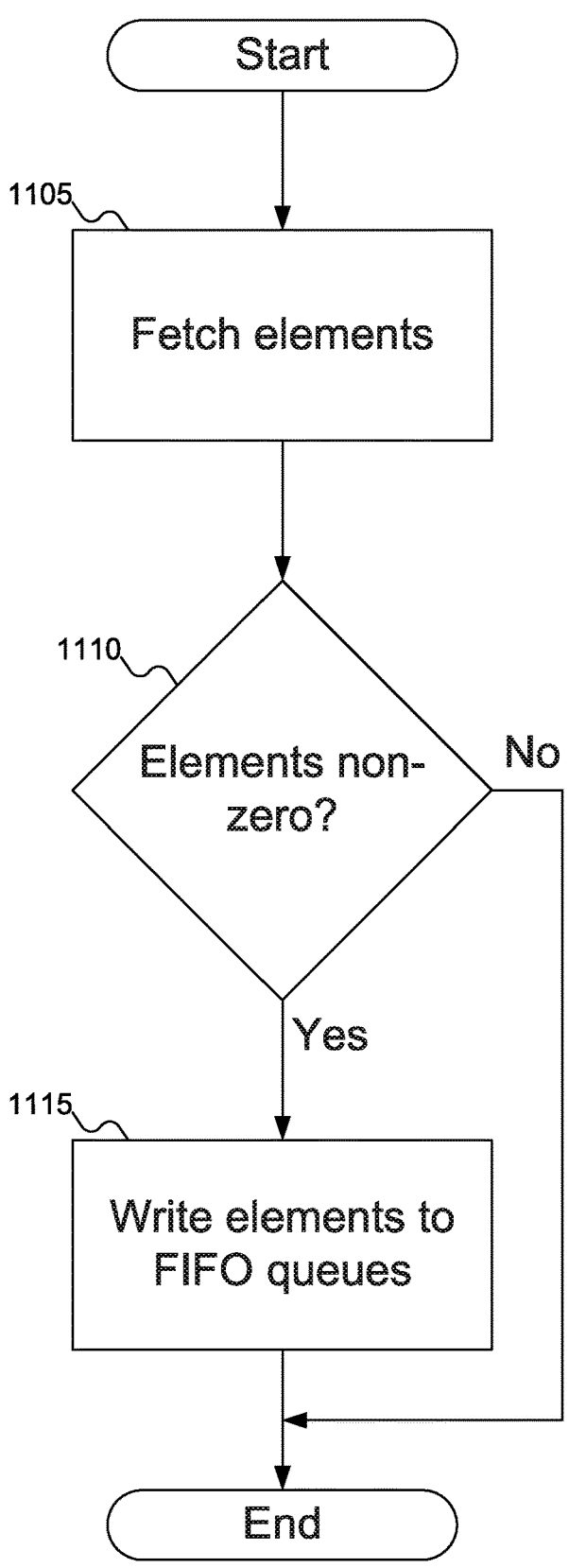
FIG. 11 shows an example flowchart of an example procedure for operations of the pre-fetcher of FIG. 5 and/or the pruner of FIG. 9, according to embodiments of the disclosure.

FIG. 11 shows an example flowchart of an example procedure for operations of pre-fetcher 510 of FIG. 5 and/or pruner 930 of FIG. 9, according to embodiments of the disclosure. At block 1105, pre-fetcher 510 of FIG. 5 and/or pruner 930 of FIG. 9 may read elements. Pre-fetcher 510 of FIG. 5 may fetch elements from memory 115 of FIG. 1, whereas pruner 930 of FIG. 9 may fetch elements from a buffer or cache within ACG module 525 of FIG. 5. The number of elements that may be fetched may vary with the implementation: for example, pre-fetcher 510 of FIG. 5 and/or pruner 930 of FIG. 9 may fetch at least as many elements as there are processing elements 630 of FIG. 6 in multiplication module 520 of FIG. 5 of the next GCN layer 515 of FIG. 5. At block 1110, pre-fetcher 510 of FIG. 5 and/or pruner 930 of FIG. 9 may check to see if elements are non-zero. Note that if desired, block 1110 may be performed in parallel for all elements pre-fetched, to leverage the parallelism supported by accelerator 135 of FIG. 1. At block 1115, if the elements are non-zero, then the elements may be written to appropriate FIFO queues 620 of FIG. 6. (Note that if pre-processor 140 of FIG. 5 has eliminated zeroes from the data from the graph, then pre-fetcher 510 of FIG. 5 may proceed to block 1115 without performing the check in block 1110, as the check in block 1110 may always return a true result.) Blocks 1110 and 1115 may also be generalized: pre-processor 140 of FIG. 1 and/or pruner 930 of FIG. 9 may change values in the data, add values to the data, or remove values other than zero from the data.

Figure 12:
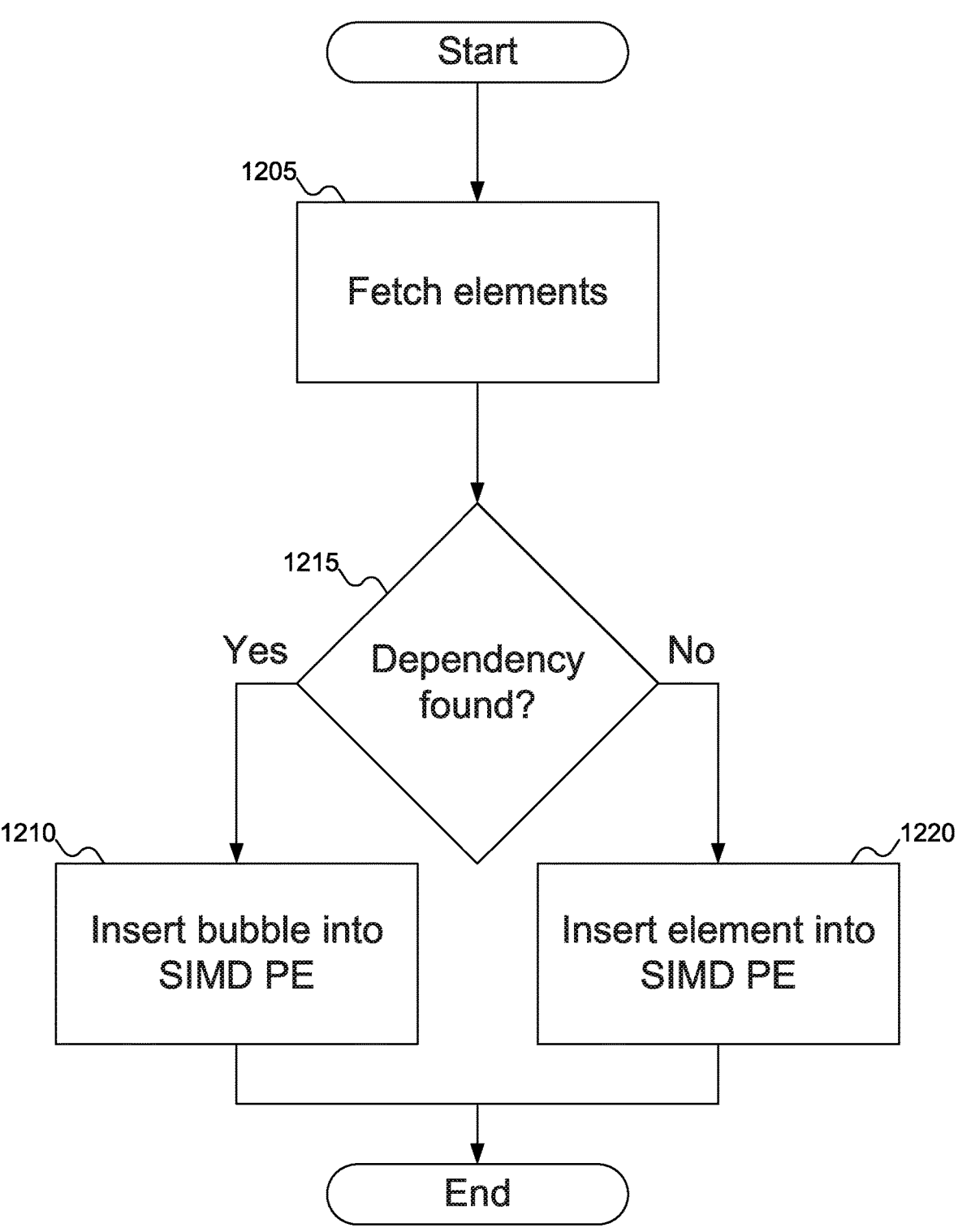
FIG. 12 shows an example flowchart of an example procedure for operations of the arbiter of FIG. 6, according to embodiments of the disclosure.

FIG. 12 shows an example flowchart of an example procedure for operations of arbiter 605 of FIG. 6, according to embodiments of the disclosure. In FIG. 12, at block 1205, arbiter 605 of FIG. 6 may fetch elements from FIFO queues 620 of FIG. 6. This operation may include "fetching" elements previously fetched by kept due to data dependencies. The number of elements actually fetched from FIFO queues 620 of FIG. 6 may therefore be the difference between the number of processing elements 630 of FIG. 6 and the number of elements waiting for processing from previous cycles. At block 1210, arbiter 605 of FIG. 6 may check to see if a data dependency is found in of the elements fetched in block 1205. Note that if desired, block 1215 may be performed in parallel for all elements fetched, to leverage the parallelism supported by accelerator 135 of FIG. 1. If a data dependency is found, then at block 1210 arbiter 605 of FIG. 6 may insert a bubble (a no-op) into 2D SIMD PE 615 of FIG. 6; otherwise, at block 1220 arbiter 605 of FIG. 6 may insert the element into 2D SIMD PE 615 of FIG. 6. (Note that if pre-processor 140 of FIG. 5 has re-ordered data from the graph to eliminate data dependencies, then arbiter 605 of FIG. 6 may proceed to block 1220 without performing the check in block 1215 or the operations in block 1210, as the check in block 1215 may always return a false result. Thus, if arbiter 605 of FIG. 6 is in the first GCN layer 515 of FIG. 5, then arbiter 605 of FIG. 6 may omit blocks 1215 and 1210.) As discussed above with reference to FIG. 8, if arbiter 605 of FIG. 6 inserts a bubble into 2D SIMD PE 615 of FIG. 6, then the data that otherwise might have been inserted into 2D SIMD PE 615 of FIG. 6 may remain in FIFO queue 620 of FIG. 6 or be stored in a buffer within arbiter 605 of FIG. 6 for later processing when the data dependency has been resolved.

Figure 13:
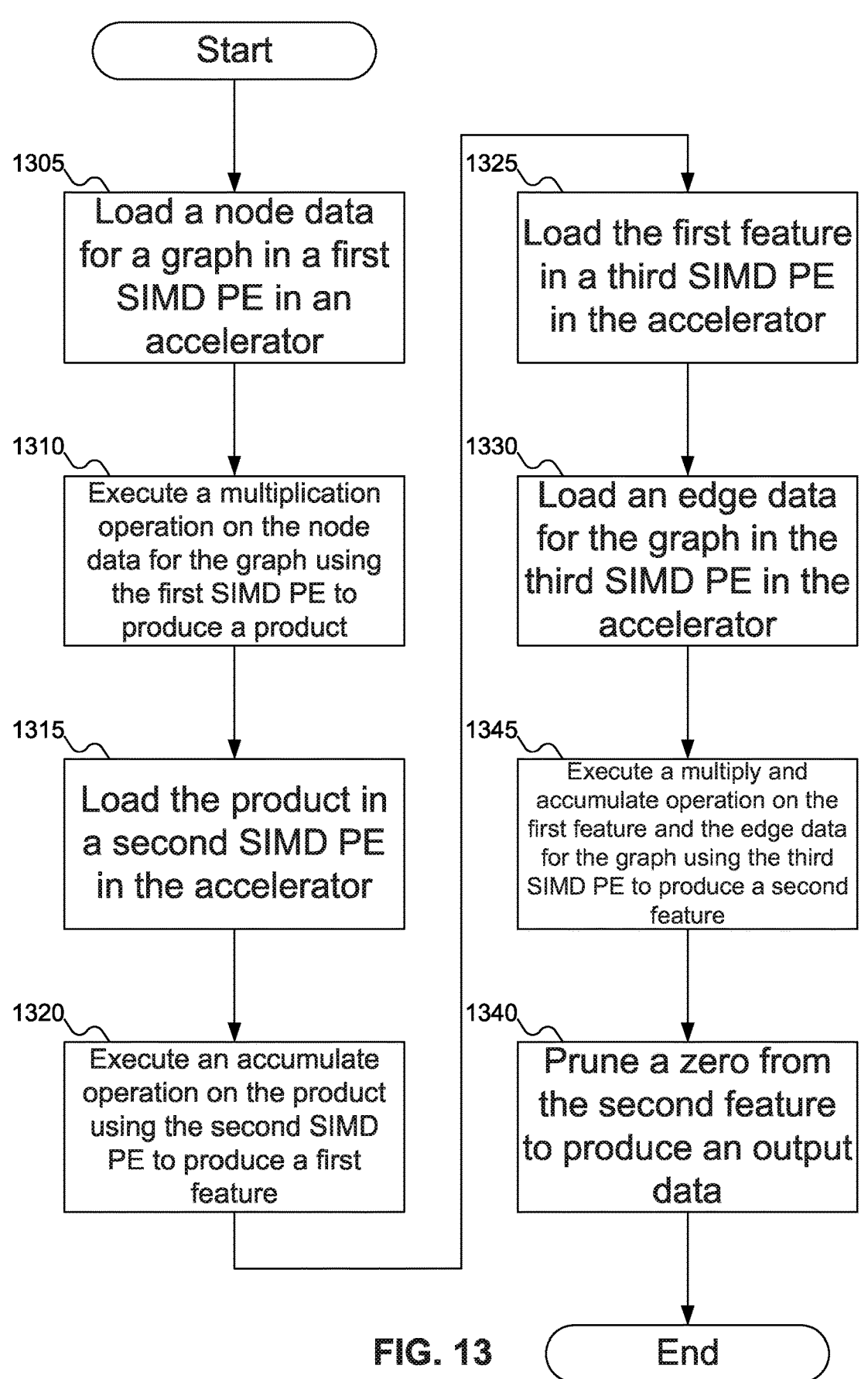
FIG. 13 shows a flowchart of an example procedure for the accelerator of FIG. 1 to determine features of the graph of FIG. 3, according to embodiments of the disclosure.

FIG. 13 shows a flowchart of an example procedure for accelerator 135 of FIG. 1 to determine features of the graph of FIG. 3, according to embodiments of the disclosure. In FIG. 13, at block 1305, accelerator 135 of FIG. 1 may load node data for graph 305 of FIG. 3 into 2D SIMD PE 615 of FIG. 6. At block 1310, multiplication module 520 of FIG. 5 may execute a multiplication operation on the node data for graph 305 of FIG. 3 loaded in 2D SIMD PE 615 of FIG. 6, to produce a product.

At block 1315, accelerator 135 of FIG. 1 may load the product into 2D SIMD PE 905 of FIG. 9. At block 1320, ACG module 525 of FIG. 5 may execute an accumulate operation on the product in 2D SIMD PE 905 of FIG. 9 to produce an intermediate feature, which may be stored in intermediate features buffer 915 of FIG. 9.

At block 1325, accelerator 135 of FIG. 1 may load the intermediate feature into 2D SIMD PE 910 of FIG. 9. At block 1330, accelerator 135 of FIG. 1 may also load edge data for graph 305 of FIG. 3 into 2D SIMD PE 910 of FIG. 9. At block 1335, ACG module 525 of FIG. 5 may execute a multiply and accumulate operation on the intermediate feature and the edge data for graph 305 of FIG. 3 in 2D SIMD PE 910 of FIG. 9 to produce a feature, which may be stored in features buffer 920 of FIG. 9.

Finally, at block 1340, pruner 930 of FIG. 9 may prune a zero from the feature to produce an output data. More generally, pruner 930 of FIG. 9 may modify the data in any desired way: by adding a value to the data, changing a value in the data, or removing a value (which may be non-zero) from the data. This output data may be written to memory 115 of FIG. 1 and may be used by various applications running on machine 105 of FIG. 1.

Figure 14:
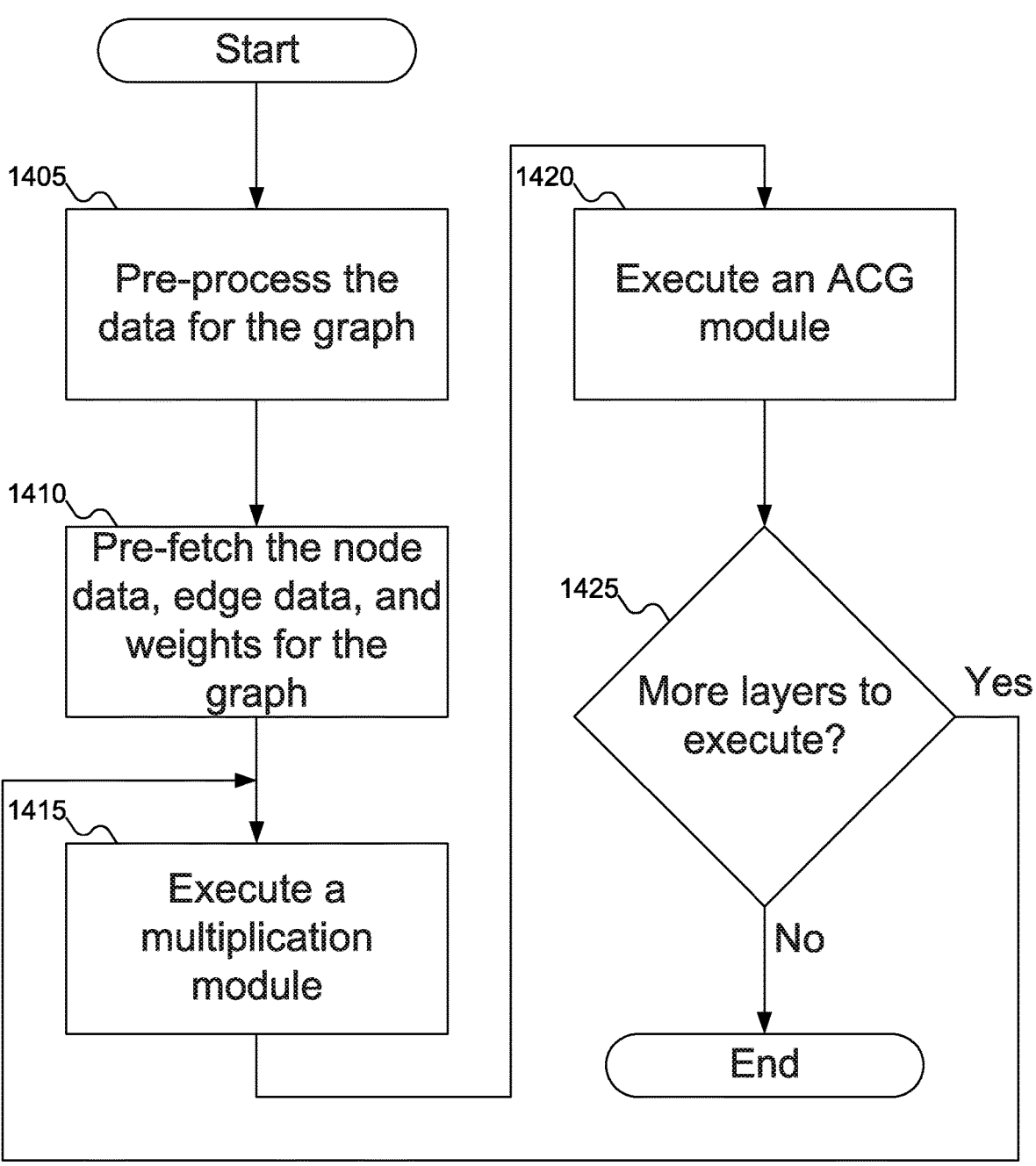
FIG. 14 shows a flowchart of an alternative example procedure for the accelerator of FIG. 1 to determine features of the graph of FIG. 3, according to embodiments of the disclosure.

FIG. 14 shows a flowchart of an alternative example procedure for accelerator 135 of FIG. 1 to determine features of the graph of FIG. 3, according to embodiments of the disclosure. In FIG. 14, at block 1405, pre-processor 140 of FIG. 1 may pre-process data for graph 305 of FIG. 3. At block 1410, pre-fetcher 510 of FIG. 5 may pre-fetch data for graph 305 of FIG. 3. This data may include, for example, node data, edge data, and weights. At block 1415, multiplication module 520 of FIG. 5 may implement a multiplication operation on some of the data for graph 305 of FIG. 3. At block 1420, ACG module 525 of FIG. 5 may implement an accumulate and aggregate operation on data for graph 305 of FIG. 3. Finally, at block 1425, if there are more GCN layers to execute, control may return to block 1415 to process another layer; otherwise, operations may complete.

Figure 15:
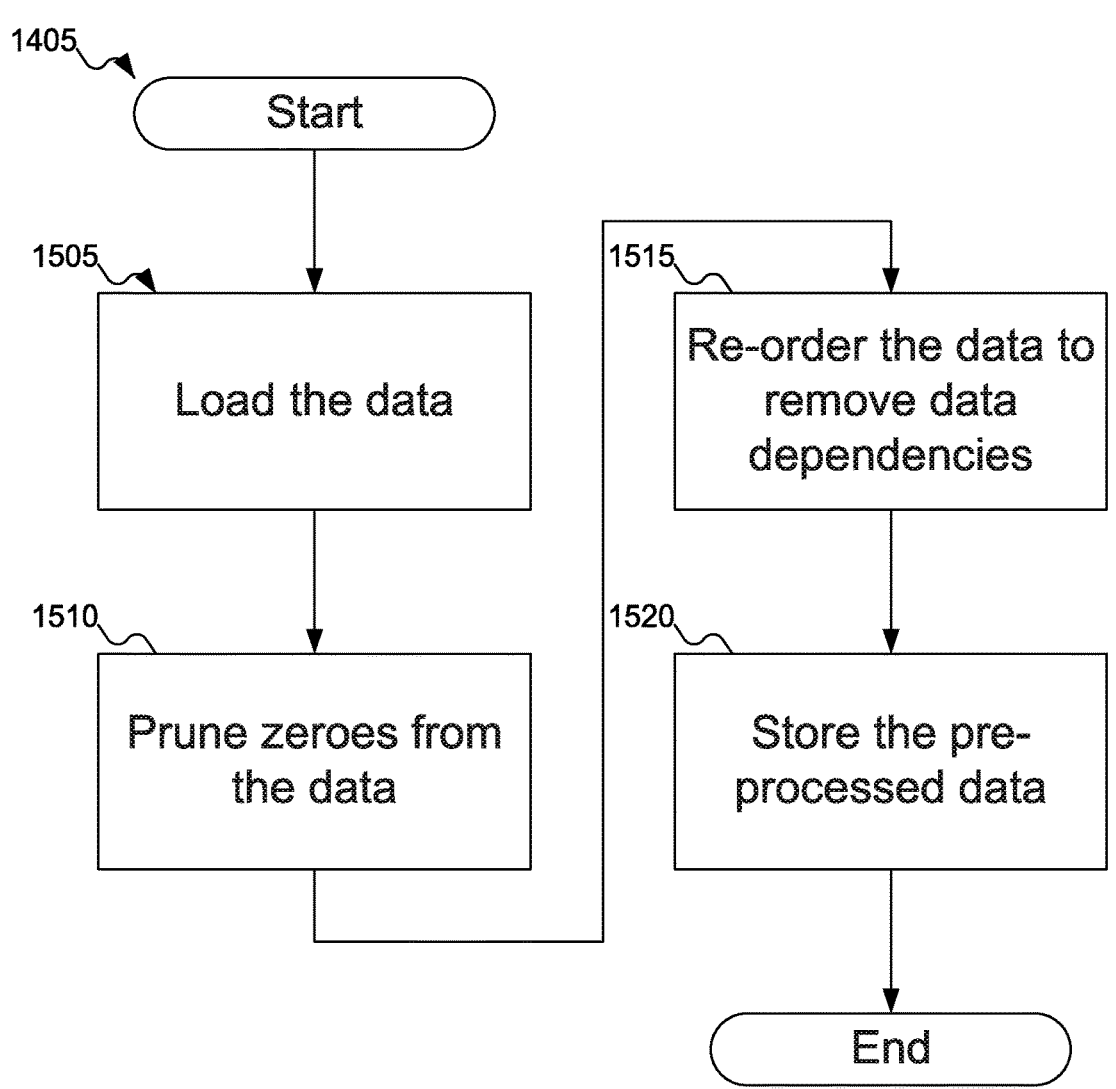
FIG. 15 shows a flowchart of an example procedure for the pre-processor of FIG. 1 to pre-process the graph of FIG. 3, according to embodiments of the disclosure.

FIG. 15 shows a flowchart of an example procedure for pre-processor 140 of FIG. 1 to pre-process graph 305 of FIG. 3, according to embodiments of the disclosure. In FIG. 15, at block 1505, pre-processor 140 of FIG. 1 may load data for graph 305 of FIG. 3 from, for example, memory 115 of FIG. 1. At block 1510, pre-processor 140 of FIG. 1 may prune zeroes from the data for graph 305 of FIG. 3 (or more generally, may modify the data for graph 305 of FIG. 3, by adding values, changing values, and/or removing values, which may be non-zero, from the data for graph 305 of FIG. 3). At block 1515, pre-processor 140 of FIG. 1 may re-order data to remove data dependencies. Finally, at block 1520, pre-processor 140 of FIG. 1 may store the pre-processed data for graph 305 of FIG. 3 back into, for example, memory 115 of FIG. 1.

Figure 16:
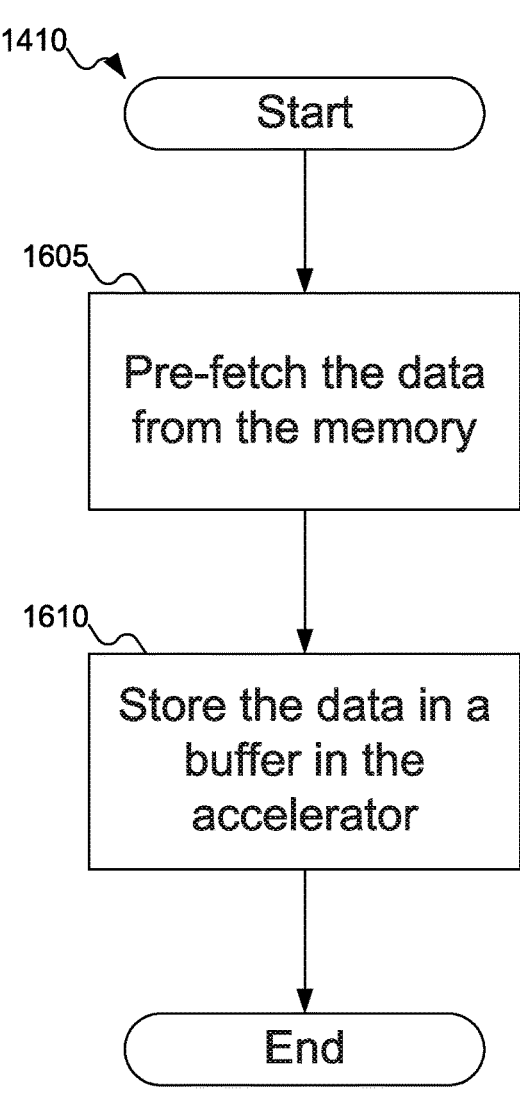
FIG. 16 shows a flowchart of an alternative example procedure for the pre-fetcher of FIG. 5 to pre-fetch data for the graph of FIG. 3, according to embodiments of the disclosure.

FIG. 16 shows a flowchart of an alternative example procedure for pre-fetcher 510 of FIG. 5 to pre-fetch data for graph 305 of FIG. 3, according to embodiments of the disclosure. In FIG. 16, at block 1605, pre-fetcher 510 of FIG. 5 may pre-fetch data for graph 305 of FIG. 3 from, for example, memory 115 of FIG. 1. At block 1610, pre-fetcher 510 of FIG. 5 may store the data for graph 305 of FIG. 3 in a buffer or cache in accelerator 135 of FIG. 1.

Figure 17:
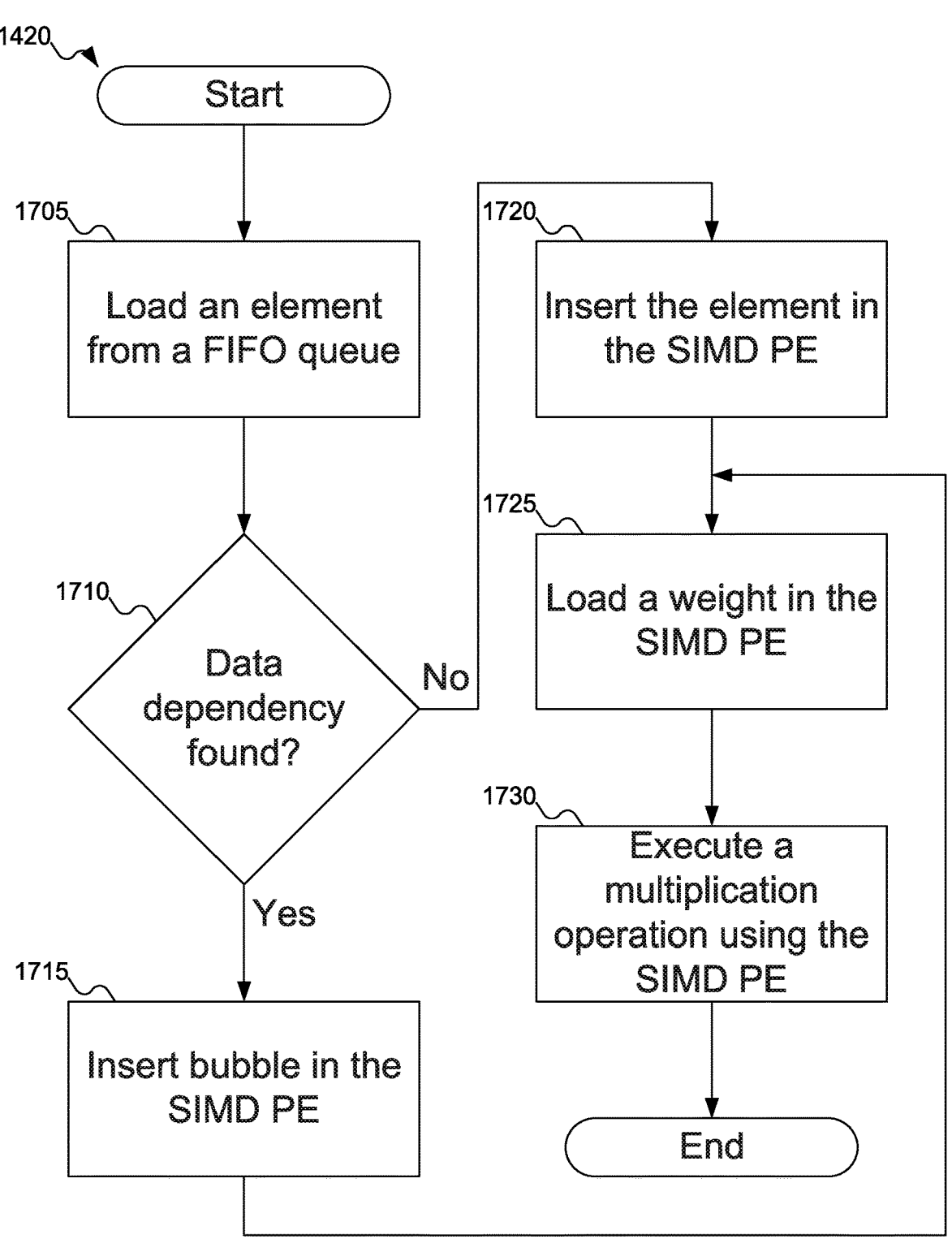
FIG. 17 shows a flowchart of an example procedure for the multiplication module of FIG. 5 to perform a multiplication operation using data of the graph of FIG. 3, according to embodiments of the disclosure.

FIG. 17 shows a flowchart of an example procedure for multiplication module 520 of FIG. 5 to perform a multiplication operation using data of graph 305 of FIG. 3, according to embodiments of the disclosure. In FIG. 17, at block 1705, arbiter 605 of FIG. 6 may load an element from FIFO queues 620 of FIG. 6. At block 1710, arbiter 605 of FIG. 6 may determine a processing element involves a data dependency: that is, the element is used to update a value that is also being updated by another element currently being processed. If so, then at block 1715 arbiter 605 of FIG. 6 may insert a bubble into 2D SIMD PE 615 of FIG. 6; otherwise, at block 1720, arbiter 605 of FIG. 6 may insert the element into 2D SIMD PE 615 of FIG. 6.

Either way, at block 1725, arbiter 605 of FIG. 6 may load weight(s) into 2D SIMD PE 615 of FIG. 6, and at block 1730, multiplication module 520 of FIG. 5 may execute a multiplication operation using 2D SIMD PE 615 of FIG. 6.

Figure 18:
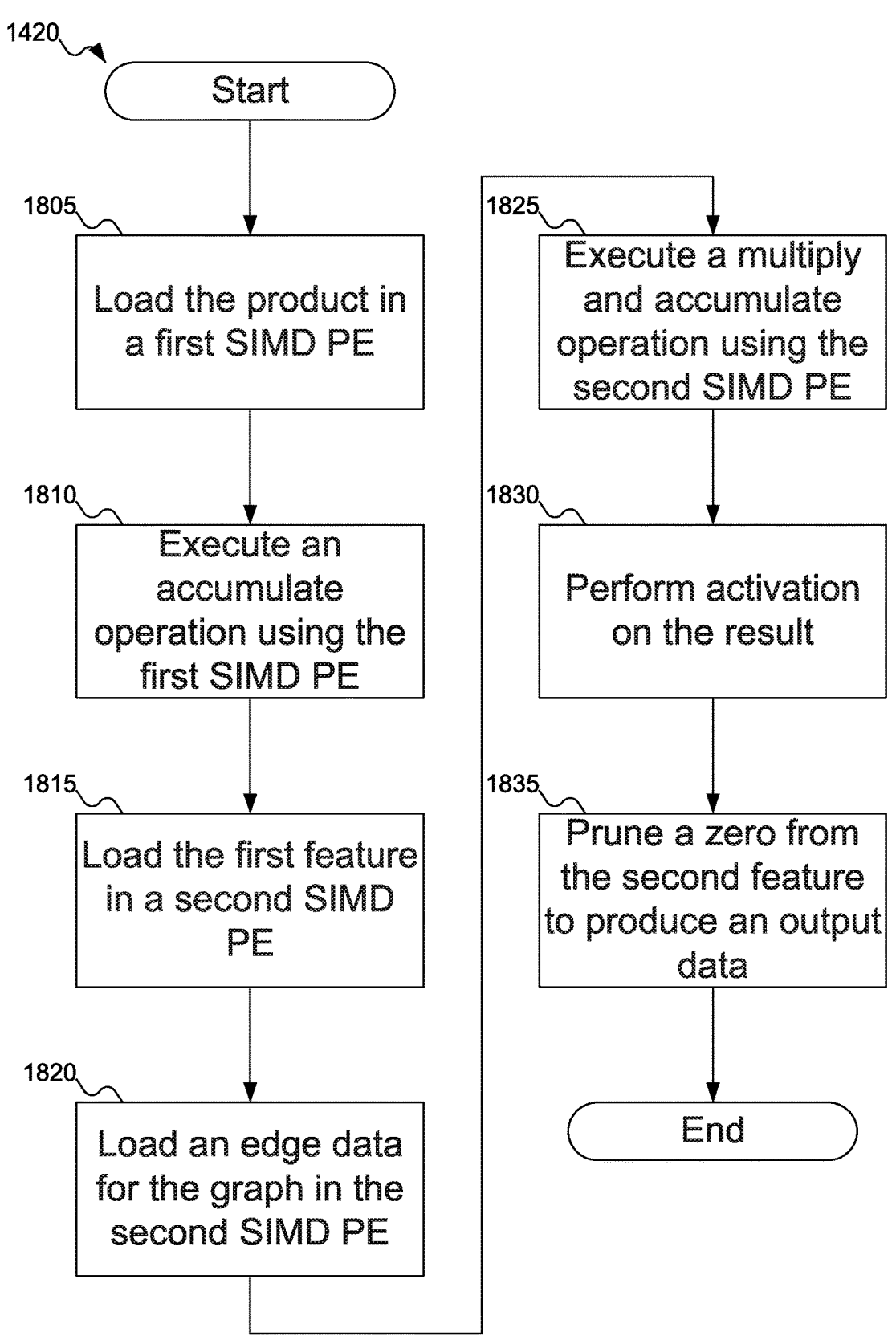
FIG. 18 shows a flowchart of an example procedure for the ACG module of FIG. 5 to perform an accumulate and aggregate operation using data of the graph of FIG. 3, according to embodiments of the disclosure.

FIG. 18 shows a flowchart of an example procedure for ACG module 525 of FIG. 5 to perform an accumulate and aggregate operation using data of graph 1905 of FIG. 3, according to embodiments of the disclosure. In FIG. 18, at block 1805, ACG module 525 of FIG. 5 may load the output of multiplication module 520 of FIG. 5 into 2D SIMD PE 905 of FIG. 9. At block 1810, ACG module 525 of FIG. 5 may execute an accumulate operation using 2D SIMD PE 905 of FIG. 9, which may be stored in intermediate features buffer 915.

At block 1815, ACG module 525 of FIG. 5 may load the features from intermediate features buffer 915 into 2D SIMD PE 910 of FIG. 9. At block 1820, ACG module 525 of FIG. 5 may also load edge data for graph 305 of FIG. 3 into 2D SIMD PE 910 of FIG. 9. At block 1825, ACG module 525 of FIG. 5 may execute a multiply and accumulate operation using 2D SIMD PE 910 of FIG. 9, which may be stored in features buffer 920.

At block 1830, ReLU 925 of FIG. 9 may perform activation on the features in features buffer 920. Finally, at block 1835, pruner 930 of FIG. 9 may prune any zeroes from the activated features (or more generally, pruner 930 of FIG. 9 may modify the data for graph 305 of FIG. 3, by adding values, changing values, and/or removing values, which may be non-zero, from the data for graph 305 of FIG. 3).

In FIGS. 10-18, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure include an accelerator for performing graph convolutional networks (GCNs). The accelerator may eliminate zero elements, which may expedite overall operation. The accelerator may identify data dependencies and either eliminate them (as part of pre-processing) or prevent data dependencies from introducing errors (by inserting a bubble where a data dependency might occur). The accelerator may minimize accessing graph data from the memory, also thereby potentially expediting operation, as accesses to memory may be slower that accesses to buffers within the accelerator.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a device, comprising:

a multiplication module to perform a multiplication based on at least a node data for a graph or a weight data;

an accumulation and aggregation (ACG) module to perform accumulation and aggregation based at least in part on the multiplication module or an edge data for the graph; and a control unit to manage the multiplication module and the ACG module.

Statement 2. An embodiment of the disclosure includes the device according to statement 1, wherein the device is implemented at least in part using at least one of a Field Programmable Gate Array (FPGA), an Application-Specific Integrated Circuit (ASIC), a central processing unit (CPU), a graphics processing unit (GPU), a general purpose GPU (GPGPU), a Data Processing Unit (DPU), or a Tensor Processing Unit (TPU).

Statement 3. An embodiment of the disclosure includes the device according to statement 1, wherein;

the device further comprises a pre-fetcher to retrieve the node data for a graph and the weight data from a memory; and the control unit is configured to manage the pre-fetcher.

Statement 4. An embodiment of the disclosure includes the device according to statement 3, wherein the pre-fetcher includes at least one first in, first out (FIFO) queue to store a value from the node data for the graph.

Statement 5. An embodiment of the disclosure includes the device according to statement 4, wherein the multiplication module is configured to select the value from the at least one FIFO queue.

Statement 6. An embodiment of the disclosure includes the device according to statement 1, the multiplication module includes at least one single instruction, multiple data processing element (SIMD PE) to produce a product based at least in part on the node data for the graph.

Statement 7. An embodiment of the disclosure includes the device according to statement 6, wherein the multiplication module includes at least two SIMD PEs.

Statement 8. An embodiment of the disclosure includes the device according to statement 6, wherein the multiplication module includes a two-dimensional (2D) SIMD PE.

Statement 9. An embodiment of the disclosure includes the device according to statement 6, wherein the SIMD PE is configured to execute a multiplication operation to produce the product.

Statement 10. An embodiment of the disclosure includes the device according to statement 6, wherein the SIMD PE is further configured to execute the multiplication operation to produce the product based at least in part on the node data for the graph and the weight data.

Statement 11. An embodiment of the disclosure includes the device according to statement 10, wherein the multiplication module further includes a weight buffer to store the weight data.

Statement 12. An embodiment of the disclosure includes the device according to statement 6, wherein the multiplication module further includes an arbiter to select a value for the node data for the graph for processing by the SIMD PE.

Statement 13. An embodiment of the disclosure includes the device according to statement 1, wherein the ACG module includes at least one SIMD PE to produce a feature based at least in part on the multiplication module.

Statement 14. An embodiment of the disclosure includes the device according to statement 13, wherein the ACG module includes at least two SIMD PEs.

Statement 15. An embodiment of the disclosure includes the device according to statement 13, wherein the ACG module includes a 2D SIMD PE.

Statement 16. An embodiment of the disclosure includes the device according to statement 13, wherein the SIMD PE is configured to execute an accumulation operation to produce the feature based at least in part on the multiplication module.

Statement 17. An embodiment of the disclosure includes the device according to statement 13, wherein the ACG module further includes a features buffer to store the feature.

Statement 18. An embodiment of the disclosure includes the device according to statement 13, wherein the ACG module further includes a second SIMD PE to produce a second feature based at least in part on the feature.

Statement 19. An embodiment of the disclosure includes the device according to statement 18, wherein the second SIMD PE is configured to execute a multiply and accumulate operation to produce the second feature based at least in part on the feature or the edge data for the graph.

Statement 20. An embodiment of the disclosure includes the device according to statement 18, wherein the ACG module further includes a rectified linear unit (ReLU) to execute an activation function to produce an activated feature based at least in part on the second feature.

Statement 21. An embodiment of the disclosure includes the device according to statement 20, wherein the ACG module further includes a pruner to modify a value in the activated feature.

Statement 22. An embodiment of the disclosure includes the device according to statement 21, wherein the pruner is configured to remove a zero from the activated feature.

Statement 23. An embodiment of the disclosure includes the device according to statement 21, wherein the pruner includes at least one FIFO queue to store the value from the data.

Statement 24. An embodiment of the disclosure includes the device according to statement 23, wherein the arbiter is configured to select data from the at least one FIFO queue.

Statement 25. An embodiment of the disclosure includes the device according to statement 1, wherein:

the multiplication module and the ACG module form a layer; and the device further comprises a second multiplication module and a second ACG module forming a second layer.

Statement 26. An embodiment of the disclosure includes the device according to statement 1, further comprising a pre-processor to modify a value in the node data for the graph.

Statement 27. An embodiment of the disclosure includes the device according to statement 26, wherein the pre-processor is configured to remove a zero from the node data for the graph.

Statement 28. An embodiment of the disclosure includes the device according to statement 26, wherein the pre-processor is configured to store the node data for the graph and the edge data for the graph in a memory.

Statement 29. An embodiment of the disclosure includes the device according to statement 28, wherein the device includes the memory.

Statement 30. An embodiment of the disclosure includes the device according to statement 28, wherein the memory includes a host memory.

Statement 31. An embodiment of the disclosure includes the device according to statement 26, wherein the pre-processor is configured to re-order the node data for the graph.

Statement 32. An embodiment of the disclosure includes the device according to statement 31, wherein the pre-processor is configured to re-order the node data for the graph to remove a data dependency.

Statement 33. An embodiment of the disclosure includes the device according to statement 26, wherein the pre-processor is executed at least in part on a host processor.

Statement 34. An embodiment of the disclosure includes the device according to statement 26, wherein the pre-processor is executed at least in part on a component of the device.

Statement 35. An embodiment of the disclosure includes the device according to statement 34, wherein the component includes at least one of an FPGA, an ASIC, a CPU, a GPU, a GPGPU, a DPU, or a TPU.

Statement 36. An embodiment of the disclosure includes a system, comprising:

a host processor;

a host memory coupled to the host processor; and a device, including:

a multiplication module to perform a multiplication based on at least a node data for a graph or a weight data;

an accumulation and aggregation (ACG) module to perform accumulation and aggregation based at least in part on the multiplication module or an edge data for the graph; and a control unit to manage the multiplication module and the ACG module.

Statement 37. An embodiment of the disclosure includes the system according to statement 36, wherein the device is implemented at least in part using at least one of a Field Programmable Gate Array (FPGA), an Application-Specific Integrated Circuit (ASIC), a central processing unit (CPU), a graphics processing unit (GPU), a general purpose GPU (GPGPU), a Data Processing Unit (DPU), or a Tensor Processing Unit (TPU).

Statement 38. An embodiment of the disclosure includes the system according to statement 36, wherein;

the device further comprises a pre-fetcher to retrieve the node data for a graph and the weight data from a memory; and the control unit is configured to manage the pre-fetcher.

Statement 39. An embodiment of the disclosure includes the system according to statement 38, wherein the pre-fetcher includes at least one first in, first out (FIFO) queue to store a value from the node data for the graph.

Statement 40. An embodiment of the disclosure includes the system according to statement 39, wherein the multiplication module is configured to select the value from the at least one FIFO queue.

Statement 41. An embodiment of the disclosure includes the system according to statement 36, the multiplication module includes at least one single instruction, multiple data processing element (SIMD PE) to produce a product based at least in part on the node data for the graph.

Statement 42. An embodiment of the disclosure includes the system according to statement 41, wherein the multiplication module includes at least two SIMD PEs.

Statement 43. An embodiment of the disclosure includes the system according to statement 41, wherein the multiplication module includes a two-dimensional (2D) SIMD PE.

Statement 44. An embodiment of the disclosure includes the system according to statement 41, wherein the SIMD PE is configured to execute a multiplication operation to produce the product.

Statement 45. An embodiment of the disclosure includes the system according to statement 41, wherein the SIMD PE is further configured to execute the multiplication operation to produce the product based at least in part on the node data for the graph and the weight data.

Statement 46. An embodiment of the disclosure includes the system according to statement 45, wherein the multiplication module further includes a weight buffer to store the weight data.

Statement 47. An embodiment of the disclosure includes the system according to statement 41, wherein the multiplication module further includes an arbiter to select a value for the node data for the graph for processing by the SIMD PE.

Statement 48. An embodiment of the disclosure includes the system according to statement 36, wherein the ACG module includes at least one SIMD PE to produce a feature based at least in part on the multiplication module.

Statement 49. An embodiment of the disclosure includes the system according to statement 48, wherein the ACG module includes at least two SIMD PEs.

Statement 50. An embodiment of the disclosure includes the system according to statement 48, wherein the ACG module includes a 2D SIMD PE.

Statement 51. An embodiment of the disclosure includes the system according to statement 48, wherein the SIMD PE is configured to execute an accumulation operation to produce the feature based at least in part on the multiplication module.

Statement 52. An embodiment of the disclosure includes the system according to statement 48, wherein the ACG module further includes a features buffer to store the feature.

Statement 53. An embodiment of the disclosure includes the system according to statement 48, wherein the ACG module further includes a second SIMD PE to produce a second feature based at least in part on the feature.

Statement 54. An embodiment of the disclosure includes the system according to statement 53, wherein the second SIMD PE is configured to execute a multiply and accumulate operation to produce the second feature based at least in part on the feature or the edge data for the graph.

Statement 55. An embodiment of the disclosure includes the system according to statement 53, wherein the ACG module further includes a rectified linear unit (ReLU) to execute an activation function to produce an activated feature based at least in part on the second feature.

Statement 56. An embodiment of the disclosure includes the system according to statement 55, wherein the ACG module further includes a pruner to modify a value in the activated feature.

Statement 57. An embodiment of the disclosure includes the system according to statement 56, wherein the pruner is configured to remove a zero from the activated feature.

Statement 58. An embodiment of the disclosure includes the system according to statement 56, wherein the pruner includes at least one FIFO queue to store the value from the data.

Statement 59. An embodiment of the disclosure includes the system according to statement 58, wherein the arbiter is configured to select data from the at least one FIFO queue.

Statement 60. An embodiment of the disclosure includes the system according to statement 36, wherein:

the multiplication module and the ACG module form a layer; and the device further comprises a second multiplication module and a second ACG module forming a second layer.

Statement 61. An embodiment of the disclosure includes the system according to statement 36, further comprising a pre-processor to modify a value in the node data for the graph.

Statement 62. An embodiment of the disclosure includes the system according to statement 61, wherein the pre-processor is configured to remove a zero from the node data for the graph.

Statement 63. An embodiment of the disclosure includes the system according to statement 61, wherein the pre-processor is configured to store the node data for the graph and the edge data for the graph in a memory.

Statement 64. An embodiment of the disclosure includes the system according to statement 63, wherein the device includes the memory.

Statement 65. An embodiment of the disclosure includes the system according to statement 63, wherein the memory includes a host memory.

Statement 66. An embodiment of the disclosure includes the system according to statement 61, wherein the pre-processor is configured to re-order the node data for the graph.

Statement 67. An embodiment of the disclosure includes the system according to statement 66, wherein the pre-processor is further configured to re-order the node data for the graph to remove a data dependency.

Statement 68. An embodiment of the disclosure includes the system according to statement 61, wherein the pre-processor is executed at least in part on a host processor.

Statement 69. An embodiment of the disclosure includes the system according to statement 61, wherein the pre-processor is executed at least in part on a component of the device.

Statement 70. An embodiment of the disclosure includes the system according to statement 69, wherein the component includes at least one of an FPGA, an ASIC, a CPU, a GPU, a GPGPU, a DPU, or a TPU.

Statement 71. An embodiment of the disclosure includes a method, comprising:

loading a node data for a graph in a first single instruction, multiple data processing element (SIMD PE) in a device;

executing a multiplication operation on the node data for the graph using the first SIMD PE to produce a product;

loading the product in a second SIMD PE in the device;

executing an accumulate operation on the product using the second SIMD PE to produce a first feature;

loading the first feature in a third SIMD PE in the device;

loading an edge data for the graph in the third SIMD PE in the device;

executing a multiply and accumulate operation on the first feature and the edge data for the graph using the third SIMD PE to produce a second feature; and

pruning a zero from the second feature to produce an output data.

Statement 72. An embodiment of the disclosure includes the method according to statement 71, wherein the device is implemented at least in part using at least one of a Field Programmable Gate Array (FPGA), an Application-Specific Integrated Circuit (ASIC), a central processing unit (CPU), a graphics processing unit (GPU), a general purpose GPU (GPGPU), a Data Processing Unit (DPU), or a Tensor Processing Unit (TPU).

Statement 73. An embodiment of the disclosure includes the method according to statement 71, further comprising pre-fetching the node data for the graph.

Statement 74. An embodiment of the disclosure includes the method according to statement 73, wherein pre-fetching the node data for the graph includes pre-fetching the node data for the graph from a memory.

Statement 75. An embodiment of the disclosure includes the method according to statement 74, wherein the memory includes a host memory.

Statement 76. An embodiment of the disclosure includes the method according to statement 74, wherein the device includes the memory.

Statement 77. An embodiment of the disclosure includes the method according to statement 71, wherein pre-fetching the node data for the graph includes storing the node data for the graph in a buffer in the device.

Statement 78. An embodiment of the disclosure includes the method according to statement 71, further comprising pre-processing the node data for the graph to produce a pre-processed node data.

Statement 79. An embodiment of the disclosure includes the method according to statement 78, further comprising storing the pre-processed node data in a memory.

Statement 80. An embodiment of the disclosure includes the method according to statement 78, wherein pre-process-ing the node data for the graph to produce the pre-processed node data includes pruning (1510) a zero from the node data for the graph.

Statement 81. An embodiment of the disclosure includes the method according to statement 78, wherein pre-process-ing the node data for the graph includes re-ordering the node data for the graph.

Statement 82. An embodiment of the disclosure includes the method according to statement 81, wherein re-ordering the node data for the graph includes removing a data dependency.

Statement 83. An embodiment of the disclosure includes the method according to statement 78, wherein pre-process-ing the node data for the graph to produce the pre-processed node data includes pre-processing the node data for the graph to produce the pre-processed node data using a host processor.

Statement 84. An embodiment of the disclosure includes the method according to statement 78, wherein pre-process-ing the node data for the graph to produce the pre-processed node data includes pre-processing the node data for the graph to produce the pre-processed node data using a component of the device.

Statement 85. An embodiment of the disclosure includes the method according to statement 84, wherein the compo-nent includes at least one of an FPGA, an ASIC, a CPU, a GPU, a GPGPU, a DPU, or a TPU.

Statement 86. An embodiment of the disclosure includes the method according to statement 71, wherein loading the node data for the graph in the first SIMD PE in the device includes loading a weight data into the first SIMD PE in the device.

Statement 87. An embodiment of the disclosure includes the method according to statement 71, wherein loading the node data for the graph in the first SIMD PE in the device includes inserting a value from the node data for the graph in a first in, first out (FIFO) queue based at least in part on the value being a positive value.

Statement 88. An embodiment of the disclosure includes the method according to statement 87, wherein the FIFO queue is in a pre-fetcher of the device.

Statement 89. An embodiment of the disclosure includes the method according to statement 87, wherein the FIFO queue is in a pruner of the device.

Statement 90. An embodiment of the disclosure includes the method according to statement 87, wherein loading the node data for the graph in the first SIMD PE in the device further includes loading the value from the FIFO queue into the first SIMD PE.

Statement 91. An embodiment of the disclosure includes the method according to statement 90, wherein loading the value from the FIFO queue into the first SIMD PE includes loading the value from the FIFO queue into the first SIMD PE using an arbiter.

Statement 92. An embodiment of the disclosure includes the method according to statement 71, wherein loading the node data for the graph in the first SIMD PE in the device includes loading the value into the first SIMD PE based at least in part on the value being independent of any pending calculation.

Statement 93. An embodiment of the disclosure includes the method according to statement 71, wherein:

loading the node data for the graph in the first SIMD PE in the device includes loading at least two elements from the node data for the graph in the first SIMD PE in the device;

loading the product in the second SIMD PE in the device includes loading at least two products in the second SIMD PE in the device; and loading the first feature in the third SIMD PE in the device includes loading at least two first features in the third SIMD PE in the device.

Statement 94. An embodiment of the disclosure includes the method according to statement 71, wherein:

loading the node data for the graph in the first SIMD PE in the device includes loading the node data for the graph in a first two-dimensional (2D) SIMD PE in the device;

loading the product in the second SIMD PE in the device includes loading the product in a second 2D SIMD PE in the device; and loading the first feature in the third SIMD PE in the device includes loading the first feature in a third 2D SIMD PE in the device.

Statement 95. An embodiment of the disclosure includes the method according to statement 71, wherein:

loading the node data for the graph in the first SIMD PE in the device includes loading the node data for the graph in the first SIMD PE in the device from a first buffer in the device;

loading the product in the second SIMD PE in the device includes loading the product in a second 2D SIMD PE in the device from a second buffer in the device; and loading the first feature in the third SIMD PE in the device includes loading the first feature in a third 2D SIMD PE in the device from a third buffer in the device.

Statement 96. An embodiment of the disclosure includes an article, comprising a non-transitory storage medium, the non-transitory storage medium having stored thereon instructions that, when executed by a machine, result in:

loading a node data for a graph in a first single instruction, multiple data processing element (SIMD PE) in a device;

executing a multiplication operation on the node data for the graph using the first SIMD PE to produce a product;

loading the product in a second SIMD PE in the device;

executing an accumulate operation on the product using the second SIMD PE to produce a first feature;

loading the first feature in a third SIMD PE in the device;

loading an edge data for the graph in the third SIMD PE in the device;

executing a multiply and accumulate operation on the first feature and the edge data for the graph using the third SIMD PE to produce a second feature; and pruning a zero from the second feature to produce an output data.

Statement 97. An embodiment of the disclosure includes the article according to statement 96, wherein the device is implemented at least in part using at least one of a Field Programmable Gate Array (FPGA), an Application-Specific Integrated Circuit (ASIC), a central processing unit (CPU), a graphics processing unit (GPU), a general purpose GPU (GPGPU), a Data Processing Unit (DPU), or a Tensor Processing Unit (TPU).

Statement 98. An embodiment of the disclosure includes the article according to statement 96, the non-transitory storage medium having stored thereon further instructions that, when executed by the machine, result in pre-fetching the node data for the graph.

Statement 99. An embodiment of the disclosure includes the article according to statement 98, wherein pre-fetching the node data for the graph includes pre-fetching the node data for the graph from a memory.

Statement 100. An embodiment of the disclosure includes the article according to statement 99, wherein the memory includes a host memory.

Statement 101. An embodiment of the disclosure includes the article according to statement 99, wherein the device includes the memory.

Statement 102. An embodiment of the disclosure includes the article according to statement 96, wherein pre-fetching the node data for the graph includes storing the node data for the graph in a buffer in the device.

Statement 103. An embodiment of the disclosure includes the article according to statement 96, the non-transitory storage medium having stored thereon further instructions that, when executed by the machine, result in pre-processing the node data for the graph to produce a pre-processed node data.

Statement 104. An embodiment of the disclosure includes the article according to statement 103, the non-transitory storage medium having stored thereon further instructions that, when executed by the machine, result in storing the pre-processed node data in a memory.

Statement 105. An embodiment of the disclosure includes the article according to statement 103, wherein pre-processing the node data for the graph to produce the pre-processed node data includes pruning (1510) a zero from the node data for the graph.

Statement 106. An embodiment of the disclosure includes the article according to statement 103, wherein pre-processing the node data for the graph includes re-ordering the node data for the graph.

Statement 107. An embodiment of the disclosure includes the article according to statement 106, wherein re-ordering the node data for the graph includes removing a data dependency.

Statement 108. An embodiment of the disclosure includes the article according to statement 103, wherein pre-processing the node data for the graph to produce the pre-processed node data includes pre-processing the node data for the graph to produce the pre-processed node data using a host processor.

Statement 109. An embodiment of the disclosure includes the article according to statement 103, wherein pre-processing the node data for the graph to produce the pre-processed node data includes pre-processing the node data for the graph to produce the pre-processed node data using a component of the device.

Statement 110. An embodiment of the disclosure includes the article according to statement 109, wherein the component includes at least one of an FPGA, an ASIC, a CPU, a GPU, a GPGPU, a DPU, or a TPU.

Statement 111. An embodiment of the disclosure includes the article according to statement 96, wherein loading the node data for the graph in the first SIMD PE in the device includes loading a weight data into the first SIMD PE in the device.

Statement 112. An embodiment of the disclosure includes the article according to statement 96, wherein loading the node data for the graph in the first SIMD PE in the device includes inserting a value from the node data for the graph in a first in, first out (FIFO) queue based at least in part on the value being a positive value.

Statement 113. An embodiment of the disclosure includes the article according to statement 112, wherein the FIFO queue is in a pre-fetcher of the device.

Statement 114. An embodiment of the disclosure includes the article according to statement 112, wherein the FIFO queue is in a pruner of the device.

Statement 115. An embodiment of the disclosure includes the article according to statement 112, wherein loading the node data for the graph in the first SIMD PE in the device further includes loading the value from the FIFO queue into the first SIMD PE.

Statement 116. An embodiment of the disclosure includes the article according to statement 115, wherein loading the value from the FIFO queue into the first SIMD PE includes loading the value from the FIFO queue into the first SIMD PE using an arbiter.

Statement 117. An embodiment of the disclosure includes the article according to statement 96, wherein loading the node data for the graph in the first SIMD PE in the device includes loading the value into the first SIMD PE based at least in part on the value being independent of any pending calculation.

Statement 118. An embodiment of the disclosure includes the article according to statement 96, wherein:

loading the node data for the graph in the first SIMD PE in the device includes loading at least two elements from the node data for the graph in the first SIMD PE in the device;

loading the product in the second SIMD PE in the device includes loading at least two products in the second SIMD PE in the device; and loading the first feature in the third SIMD PE in the device includes loading at least two first features in the third SIMD PE in the device.

Statement 119. An embodiment of the disclosure includes the article according to statement 96, wherein:

31 32 loading the node data for the graph in the first SIMD PE in the device includes loading the node data for the graph in a first two-dimensional (2D) SIMD PE in the device;

loading the product in the second SIMD PE in the device includes loading the product in a second 2D SIMD PE in the device; and loading the first feature in the third SIMD PE in the device includes loading the first feature in a third 2D SIMD PE in the device.

Statement 120. An embodiment of the disclosure includes the article according to statement 96, wherein:

loading the node data for the graph in the first SIMD PE in the device includes loading the node data for the graph in the first SIMD PE in the device from a first buffer in the device;

loading the product in the second SIMD PE in the device includes loading the product in a second 2D SIMD PE in the device from a second buffer in the device; and loading the first feature in the third SIMD PE in the device includes loading the first feature in a third 2D SIMD PE in the device from a third buffer in the device.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A device, comprising:
a multiplication module to perform a matrix multiplication based on at least a node data for a graph or a weight data;
an accumulation and aggregation (ACG) module to perform accumulation and aggregation based at least in part on the multiplication module or an edge data for the graph; and
a control unit to manage the multiplication module and the ACG module,
wherein the device is implemented in hardware.

2. The device according to claim 1, wherein the device is implemented at least in part using at least one of a Field Programmable Gate Array (FPGA), an Application-Specific Integrated Circuit (ASIC), a central processing unit (CPU), a graphics processing unit (GPU), a general purpose GPU (GPGPU), a Data Processing Unit (DPU), or a Tensor Processing Unit (TPU).

3. The device according to claim 1, wherein;
the device further comprises a pre-fetcher to retrieve the node data for a graph and the weight data from a memory; and
the control unit is configured to manage the pre-fetcher.

4. The device according to claim 1, the multiplication module includes at least one single instruction, multiple data processing element (SIMD PE) to produce a product based at least in part on the node data for the graph.

5. The device according to claim 4, wherein the multiplication module further includes an arbiter to select a value for the node data for the graph for processing by the SIMD PE.

6. The device according to claim 1, wherein the ACG module includes at least one SIMD PE to produce a feature based at least in part on the multiplication module.

7. The device according to claim 6, wherein the ACG module further includes a second SIMD PE to produce a second feature based at least in part on the feature.

8. The device according to claim 7, wherein the ACG module further includes a rectified linear unit (ReLU) to execute an activation function to produce an activated feature based at least in part on the second feature.

9. The device according to claim 8, wherein the ACG module further includes a pruner to modify a value in the activated feature.

10. The device according to claim 1, wherein:
the multiplication module and the ACG module form a layer; and
the device further comprises a second multiplication module and a second ACG module forming a second layer.

11. A system, comprising:
a host processor;
a host memory coupled to the host processor; and
a device, including:
a multiplication module to perform a matrix multiplication based on at least a node data for a graph or a weight data;
an accumulation and aggregation (ACG) module to perform accumulation and aggregation based at least in part on the multiplication module or an edge data for the graph; and
a control unit to manage the multiplication module and the ACG module,
wherein the device is implemented in hardware.

12. The system according to claim 11, further comprising a pre-processor to modify a value in the node data for the graph.

13. The system according to claim 12, wherein the pre-processor is further configured to store the node data for the graph and the edge data for the graph in a memory.

14. The system according to claim 12, wherein the pre-processor is further configured to re-order the node data for the graph.

15. The system according to claim 12, wherein the pre-processor is executed at least in part on a host processor.

16. A method, comprising:
loading a node data for a graph in a first single instruction, multiple data processing element (SIMD PE) in a device;
executing a matrix multiplication operation on the node data for the graph using the first SIMD PE to produce a product;
loading the product in a second SIMD PE in the device;
executing an accumulate operation on the product using the second SIMD PE to produce a first feature;
loading the first feature in a third SIMD PE in the device;
loading an edge data for the graph in the third SIMD PE in the device;
executing a multiply and accumulate operation on the first feature and the edge data for the graph using the third SIMD PE to produce a second feature; and
pruning a zero from the second feature to produce an output data.

17. The method according to claim 16, further comprising pre-fetching the node data for the graph.

18. The method according to claim 16, further comprising pre-processing the node data for the graph to produce a pre-processed node data.

19. The method according to claim 18, wherein pre-processing the node data for the graph to produce the pre-processed node data includes pruning a zero from the node data for the graph.

20. The method according to claim 18, wherein preprocessing the node data for the graph includes re-ordering the node data for the graph.

\* \* \* \* \*